US012057672B2

(12) United States Patent
Glockseisen et al.

(10) Patent No.: US 12,057,672 B2
(45) Date of Patent: Aug. 6, 2024

(54) CRIMPING PLIERS, DIE HALF UNIT AND METHOD FOR THE ASSEMBLY

(71) Applicant: WEZAG GmbH & Co. KG, Stadtallendorf (DE)

(72) Inventors: Thomas Glockseisen, Düsseldorf (DE); Roman Zinser, Neustadt (DE)

(73) Assignee: WEZAG GmbH & Co. KG, Stadtallendorf (DE)

( * ) Notice: Subject to any disclaimer, the term of this patent is extended or adjusted under 35 U.S.C. 154(b) by 403 days.

(21) Appl. No.: 17/503,451

(22) Filed: Oct. 18, 2021

(65) Prior Publication Data

US 2022/0123514 A1 Apr. 21, 2022

(30) Foreign Application Priority Data

Oct. 19, 2020 (EP) .................................... 20202479

(51) Int. Cl.

| | |
|---|---|
| ***H01R 43/04*** | (2006.01) |
| ***B25B 7/12*** | (2006.01) |
| ***B25B 27/14*** | (2006.01) |
| ***H01R 43/042*** | (2006.01) |

(52) U.S. Cl.

CPC ............ *H01R 43/042* (2013.01); *B25B 7/12* (2013.01); *B25B 27/146* (2013.01)

(58) Field of Classification Search

CPC .... B21D 39/04; B21D 39/048; B25B 27/146; H01R 43/042; H01R 43/0425; H01R 43/0428; H01R 43/058

See application file for complete search history.

(56) References Cited

U.S. PATENT DOCUMENTS

2020/0251869 A1* 8/2020 Weisheit ............... B25B 27/146

FOREIGN PATENT DOCUMENTS

| | | |
|---|---|---|
| DE | 197 28 685 A1 | 1/1999 |
| EP | 0 516 598 B1 | 11/1994 |
| EP | 0 888 850 B1 | 6/2004 |
| WO | 2019/105703 A1 | 6/2019 |
| WO | 2019/105704 A1 | 6/2019 |

* cited by examiner

*Primary Examiner* — Debra M Sullivan

(74) *Attorney, Agent, or Firm* — The Sladkus Law Group

(57) ABSTRACT

The invention relates to crimping pliers wherein a die comprises two die half units. The die half units each comprise a die half and a bearing body. The bearing body is supported in an associated bearing accommodation of a pliers jaw. The die halves are supported by a rotational bearing for being rotated about a crimping axis relative to the bearing body.

According to the invention it is possible to assemble and disassemble the bearing body of the die half unit to and from the bearing accommodation of the pliers jaw without the use of any tool. It is also possible that a latching or locking device is used for the assembly.

13 Claims, 17 Drawing Sheets

CRIMPING PLIERS, DIE HALF UNIT AND METHOD FOR THE ASSEMBLY

CROSS REFERENCE TO RELATED APPLICATIONS

This application claims priority to co-pending European Patent Application No. EP 20 202 479.0 filed Oct. 19, 2020.

FIELD OF THE INVENTION

The invention relates to crimping pliers wherein pliers jaws are moved relatively to each other due to a manual actuation of hand levers by use of a drive mechanism (e. g. a toggle lever drive). With the movement of the pliers jaws die half units held on the pliers jaws approach each other over a crimping stroke so that it is possible to crimp a workpiece between the die half units. The workpiece might e. g. be a plug or connector, an end region of a cable comprising at least one electrical conductor being arranged therein. By means of the crimping both the mechanical connection between the plug and the cable as well as the electrical connection of the plug to the at least one electrical conductor is provided. The inventive crimping pliers can be used for manufacturing any crimping contour, in particular a trapezoidal crimp or four-cornered crimp.

The invention also relates to a crimping half unit designated for crimping pliers. Finally, the invention also relate to a method for the assembly of a die comprising two die halves for establishing crimping pliers.

BACKGROUND OF THE INVENTION

EP 0 516 598 B1 discloses that it might be advantageous to allow an insertion of a workpiece alternatively in lateral direction or from the front into the die of crimping pliers. For that purpose EP 0 516 598 B1 suggests that the die halves of the die half units are supported for being rotated about the crimping axis on the associated pliers jaws. In this case it is possible to pivot the die halves in a way about the crimping axis such that the accommodation for the workpiece formed by the die halves can alternatively have a lateral orientation or frontal orientation. In order to provide the rotational degree of freedom of the die halves about the crimping axis the die half units each comprise a bearing body which here consists of an U-shaped part made of plastic. The side legs of the U-shaped bearing body comprise semi-shell shaped bearing surfaces on the side facing towards each other, the bearing surfaces together forming a bearing lug. A rotational stud is supported in the bearing lug. The rotational stud is formed by the die half on the side facing away from the die contour. On the outer side the U-shaped side legs of the bearing bodies comprise cylindrical studs being arranged coaxially to each other. For assembling the die half units and for assembling the die half units to associated pliers jaw at first the side legs of the U-shaped bearing bodies are pressed towards each other. In this compressed state the bearing bodies are introduced into the intermediate space of plates of one pliers jaw. With an elastic widening of the side legs of the bearing bodies the bearing studs enter into corresponding bearing bores of the plates of the pliers jaws. This leads to the result that the bearing bodies are supported for being pivoted about pivoting axes having an orientation vertical to the pliers head plane relative to the pliers jaw. The assembly of the die halves to the bearing bodies is provided by inserting the rotational stud into the bearing lug of the bearing body. The die half is secured on the bearing body by screwing a screw with a washer into the free front side of the bearing stud so that in the neighborhood of the bearing lug the bearing body is captured between the washer and a base body of the die half. By the accommodation of the rotational stud in the bearing lug a rotational bearing is provided by which the die half is supported for being rotated about the crimping axis relative to the bearing body. In order to provide that the two die halves are pivoted about the respective rotational bearing and about the crimping axis with the same pivoting angles (so that also the required same orientation of the die contours of the die halves is guaranteed) according to EP 0 516 598 B1 parallel guiding pins extend from one die half towards the other die half. These guiding pins are then received under the provision of a guiding defect in respective guiding bores of the base body of the other die half.

DE 197 28 685 A1 (corresponding to EP 0 888 850 B1) additionally proposes that rotational bearing by which the die half is supported for being rotated relative to the bearing body comprises a latching device so that it is possible to latch the die halves on the one hand in a frontal orientation and on the other hand in a lateral orientation. Here, the latching device comprises a spring element held by the bearing body which comprises a latching nose which interacts with a longitudinal groove of the rotational stud for providing the latching effect.

WO 2019/105703 A1 and WO 2019/105704 A1 (corresponding to US 2020/0251869 A1) both disclose die half units which can be pivoted relative to the pliers jaws about the crimping axis. Here, the die halves are not guided relative to each other by the accommodation of guiding pins in guiding bores. Instead, the die halves comprise die half plate bodies having an orientation parallel to each other. The die half plate bodies engage each other for providing a guiding effect in a direction transverse to the die plate bodies. An additional guiding effect is provided by guiding plates, the guiding plates having a surface normal extending parallel to the die plate bodies. The two die halves have the same designs. In order to provide that the die half can be rotated about the crimping axis the base body of the die half comprises a bore wherein a bearing stud of the bearing body is supported for being rotated. An axial securing of the rotational stud of the bearing body in the bore of the die half is provided by an U-shaped insertion part which can be inserted through a lateral recess of the die half. In the assembled position the insertion part is secured in the direction of the crimping axis in the accommodation of the die half. Side legs of the U-shaped insertion part engage in a corresponding groove of the rotational stud so that the rotational stud is secured in axial direction in the die half. The bottom of the groove of the rotational stud might have a non-round cross-section for allowing a latching of the rotational position of the die half about the rotational bearing and about the crimping axis. For disassembling the die half from the bearing body it is required to withdraw the insertion part under an elastic widening of the same. For that purpose it is required to grip the insertion part at the base leg of the U by pliers or to apply a withdrawing force by a pointed tool on the front faces of the side legs of the U-shaped insertion part. Outside from the die half the bearing body comprises a pivoting stud with end-sided guiding jaws, the pivoting stud having an orientation transverse to the crimping axis. The pivoting stud is accommodated in a bearing accommodation of the pliers jaw. The bearing accommodation extends over more than the half of the circumferential extension of the pivoting stud in order to provide that the pivoting stud is held in an non-detachable way. It is assumed that the pivoting stud is pressed into the bearing accommodation of the pliers jaw with high factory-provided assembly forces with an elastic and/or plastic deformation of the pivoting stud and/or the bearing accommodation. By the accommodation of the pivoting stud in the bearing accommodation it is possible to provide a pivoting degree of freedom of the die half units relative to the associated pliers jaw about a pivot axis having an orientation vertical to the pliers head plane.

SUMMARY OF THE INVENTION

The present invention in particular proposes crimping pliers which are in particular improved with respect to

- the assembly of a die half unit or a die and/or
- the disassembly of a die half unit or a die and/or
- the bearing support of a die half unit on a pliers jaw of the crimping pliers and/or
- the reliability of the connection of the die half unit to the pliers jaw of the crimping pliers.

Furthermore, for one embodiment the invention proposes

- a correspondingly improved die half unit as well as
- a method for the assembly of a die comprising two die half parts for establishing crimping pliers.

The crimping pliers might comprise a die which serves for crimping the workpiece. The die comprises two die half units. The die half units are each supported on an associated pliers jaw of the crimping pliers. At least one die half unit comprises a die half and a bearing body. Here, the die half has a die half contour which interacts with the workpiece during the crimping process.

The bearing body is supported in a bearing accommodation of the associated pliers jaw so that a die half bearing is established. The die half bearing should allow a releasable assembly of the die half unit to the pliers jaw so that the die half is held on the pliers jaw in a loss-proof fashion. Furthermore, the die half bearing serves for transmitting the crimping force (generated by the actuation of the hand levers and increased in some cases by the drive mechanism) from the pliers jaw to the die half unit so that the die half is pressed with the crimping force to the outer surface of the workpiece. Furthermore, the die half bearing provides an unlimited or limited pivoting degree of freedom with a pivoting axis having an orientation vertical to the pliers head plane. This pivoting degree of freedom allows a pivoting movement of the die half unit relative to the pliers jaw for allowing a compensating movement which is required over the crimping stroke of the pliers jaws because the pivoting of the pliers jaws leads to a change of the relative angle of the pliers jaws.

Furthermore, the die half is supported on the bearing body for being rotated about a crimping axis by a rotational bearing. By means of this rotational degree of freedom, it is possible to change the orientation of the die half according to the needs. Accordingly, it is e. g. possible to insert the workpiece into the die in a lateral direction or from the front (or also in any other orientation) and/or to crimp the workpiece in any such orientation during the crimping process. In so far, the crimping pliers might also have a design corresponding to the embodiments disclosed in the beginning.

It is possible to assemble and disassemble the bearing body of the die half unit to and from the bearing accommodation of the pliers jaw without the use of any tool and so alone by hand. There is in particular now screwed connection and/or no riveted connection and/or no connection with a locking ring or snap ring which has to be widened by use of pliers. In this way it is possible to provide that the mechanical pliers part of the crimping pliers can be used with dies having die half units with different die contours, for different crimping strokes and the like because it is possible to exchange the die in this way and without the use of a tool. An exchange of this type can also be used if die half units have worn out or if different types of workpieces have to be crimped which then requires the use of different die half units.

It is possible that an embodiment according to the invention provides an advantage over the crimping pliers known from the prior art because

- according to EP 0 516 598 B1 an exchange besides the elastic deformation of the bearing body also requires the screwing of the washer to the rotational stud requiring a tool embodied as a screw driver and
- according to DE 197 28 685 A1 it is required to release a snap ring which also requires a tool.

It is possible that the bearing body and the bearing accommodation are connected to each other by a holding device. The holding device does not absolutely fix the bearing body relatively to the bearing accommodation. Instead, the holding device only limits or removes at least one degree of freedom (in particular the assembly degree of freedom and/or disassembly degree of freedom) between the bearing body and the bearing accommodation. Preferably, here the holding device allows the pivoting degree of freedom of the bearing body relative to the bearing accommodation about a rotational axis having an orientation vertical to the pliers head plane.

For a first embodiment the holding device is embodied as a snapping or "latching device". A latching device of this type is formed between two components, here the bearing body and the bearing accommodation. One of the components comprises a latching element embodied as a latching protrusion [or a latching recess] whereas the other component comprises a counter-latching element formed by a latching recess [or a latching protrusion]. In the latched position of the components the latching protrusion is accommodated in the latching recess with a positive engagement so that the holding is provided by a latching effect. For the disassembly and/or assembly of the latching connection the user applies a force which (in particular due to a present inclined surface) leads to an elastic deformation or elastically supported movement of the latching protrusion and/or the latching recess. The elastic deformation or elastically supported movement for the assembly allows the entry of the latching protrusion into the latching recess and the latching in the same and/or for the disassembly allows the exit of the latching protrusion from the latching recess and so the unlatching from the same. In this way a latching device can be latched or unlatched without further measures only by applying sufficient assembly forces or disassembly forces in assembly direction or disassembly direction where the positive engagement is provided or removed by an elastic deformation.

For a second embodiment the holding device is embodied as a "locking device". A locking device of this type is formed between two components, here the bearing body and the bearing accommodation. One of the components here comprises a locking element embodied as a locking protrusion [or a locking recess] whereas the other component comprises a counter-locking element comprising a locking recess [or a locking protrusion]. In the locked position of the components the locking protrusion is accommodated in the locking recess with a positive engagement so that the holding is provided by a locking. A disassembly and/or assembly of the locking connection can (differing from the latching device) not only be provided in the way that the user applies a sufficiently high force in assembly direction or disassembly direction. Instead, the locking or unlocking of the locking device is provided by a separate manual actuation of the locking element or the counter-locking element. The separate manual actuation moves the locking element or the counter-locking element (at least with one component of the movement) transverse to the assembly direction or disassembly direction of the components. Preferably, in the locking device a transverse surface having an orientation transverse to the assembly direction and/or disassembly direction is effective between the locking element and the counter-locking element.

It is generally possible that the insertion of the bearing body into the bearing accommodation uses a latching effect and the exit of the bearing body from the bearing accommodation requires an unlatching so that for the insertion and the exit only the required forces have to be generated. It is also possible that the bearing body is inserted into bearing accommodation with a locking effect and the exit from the bearing accommodation requires an unlocking which requires the separate manual actuation of the locking element or the counter-locking element. For a particular proposal, the bearing body is inserted into the bearing accommodation by use of a latching via a latching device so that it is only required to bring the bearing body close to the bearing accommodation without the need of the actuation of a separate manual (counter-)locking element and the bearing body has only to be pressed with a sufficient assembly force into the bearing accommodation until the bearing body latches in the bearing accommodation. Instead, for this proposal the bearing body is locked against an exit from the bearing accommodation so that for the exit of the bearing body from the bearing lug it is required to actuate a separate manual (counter-)locking element. In this way on the one hand a simply assembly of the bearing body in the bearing accommodation is provided. On the other hand it is nevertheless in a reliable way provided that the bearing body will not exit from the bearing accommodation in an unintended way. Instead, the exit of the bearing body from the bearing accommodation is only possible if the user allows the exit manually by actuating the separate (counter-)locking element. Also an undesired release of the bearing body from the bearing accommodation due to a faulty operation of the crimping pliers or also a functional impairment of the crimping pliers leading to pulling forces biasing the die half unit cannot lead to the result that the die half unit unintentionally detaches from the pliers jaw.

For one embodiment the bearing accommodation is a recess. In this case the bearing cross-section of the bearing body is arranged in the recess. The recess is by both the pliers jaw and a counter-holding element. On the one hand it is possible that the bearing body is directly supported on the pliers jaw (in particular in the direction of the crimping force). The counter-holding element might embodied as a latching element and/or locking element. According to this proposal the counter-holding element is moveable between a holding position and a released position (and vice versa). In the holding position the counter-holding element blocks the bearing body from an exit from the recess. Instead, in the released position of the counter-holding element the bearing body is able to exit from the recess. In the case that the counter-holding element is embodied as a latching element, the movement from the holding position into the released position is induced by an elastic movement of the counter-holding element due to sufficiently high removal forces applied on the bearing body and/or a movement of the counter-holding element from the released position into the holding position is induced by the elastic bias of the counter-holding element. Instead, in the case that the counter-holding element is embodied as a locking element a movement from the holding position into the released position (and vice versa) requires a manual separate actuation of the locking element.

It is e. g. possible that the holding element or the counter-holding element comprises an inclined insertion surface. The inclined insertion surface is inclined relative to an insertion direction for inserting the bearing body into the bearing accommodation (preferably with an angle being larger than 0° and smaller than 90°, e. g. with an angle between 15° and 75°). This inclination of the inclined insertion surface has the effect that when inserting the bearing body in the insertion direction into the bearing accommodation the bearing body contacts the inclined insertion surface. The assembly force or insertion force is then converted by the inclined insertion surface into an actuation force biasing the (counter-)holding element which elastically biases the (counter-) element from the holding position towards the released position. In this case also the (counter-) holding element is embodied as a latching element.

However, it is also possible that the (counter-)holding element comprises a locking surface. In this case the locking surface has an orientation transverse to the insertion direction for inserting the bearing body into the bearing accommodation or transverse to the removal direction for removing the bearing body from the bearing accommodation. When inserting the bearing body in insertion direction with an assembly force or insertion force into the bearing accommodation, the bearing body contacts the locking surface which makes the entry of the bearing body impossible. Instead, the entry is only possible when separately manually actuating the counter-holding element. In a corresponding way the bearing body cannot be removed only by the application of a removal force on the bearing accommodation. Instead, a removal force only leads to the effect that the bearing body is pressed against the locking surface without causing a movement of the locking surface for removal of the positive engagement. Accordingly, also for the removal a separate manual actuation of the counter-holding element is required for the unlocking.

The counter-holding element might for another embodiment of this second variant be guided when being displaced relative to the pliers jaw (e. g. in a direction transverse to the crimping axis or also with an inclination relative to the crimping axis).

Furthermore, it is possible that the counter-holding element is supported by a spring on the pliers jaw. The spring might bias the counter-holding element towards the holding position. In the case that the counter-holding element is guided in a direction transverse to the crimping axis relative to the pliers jaw and that the counter-holding element does not comprise an inclined insertion surface or inclined removal surface the counter-holding element forms a locking element which can only be released by a separate manual actuation. Instead, the counter-holding element might be embodied as a latching element if the holding element is not guided transverse to the crimping axis relative to the pliers jaw, but under an acute angle relative to the crimping axis and/or the holding element and/or the counter-holding element comprises an inclined insertion surface or inclined removal surface.

Another embodiment bases on the finding that in some cases a support of the die half during the crimping process on the pliers jaw is required with the crimping force having a force level which is one magnitude higher than the force level for securing the die half unit against an undesired removal. On the basis of this finding it is proposed that the crimping force is supported via the bearing body (exclusively or almost) in the bearing accommodation on the pliers jaw whereas a removal force is (exclusively or almost) supported by the counter-holding element. The pliers jaw might here have a massive design and might e. g. be made of metal for providing a reliable support of the high crimping force. Instead, lower demands are applicable for the support of the removal force via the counter-holding element so that the counter-holding element might e. g. be manufactured from plastic and also any guidance of the counter-holding element might be designed for reduced demands.

It is possible that the assembly and/or disassembly is provided in a direction parallel to the pliers head plane. The assembly can here also be provided from the interior of the bit of tongs (e. g. with a direction of the assembly approximately corresponding to the direction of the crimping force during the operation).

The first die half unit can be connected by a first variant to the bearing accommodation of a first pliers jaw whereas the second die half unit is connected by a second variant to the associated pliers jaw, the second variant corresponding to the above described type of connection.

For the first variant the bearing body is assembled to the bearing accommodation by bringing the bearing body into an insertion orientation and by inserting the bearing body in the direction of the insertion orientation into the bearing accommodation. In this insertion orientation of the bearing body the bearing body might be able to reexit from the bearing accommodation with a movement in opposite direction. However, subsequently for the further assembly the bearing body is pivoted in a way such that the bearing body is brought into a securing orientation in the bearing accommodation. In this securing orientation the bearing body establishes a positive engagement or a kind of catching with the bearing accommodation in the direction of the securing orientation. Accordingly, it is not possible that the bearing body exits in the direction of the securing orientation from the bearing accommodation so that a reliable assembly is provided. Preferably, the insertion orientation in the bearing accommodation is only possible in a partly assembled state of the crimping pliers whereas during the normal operation of the crimping pliers and during the crimping process the bearing body can only be brought into the securing orientation in the bearing accommodation or into orientations in the neighborhood of the securing orientation where still the positive engagement or catching is provided. Shortly summarized, the assembly requires a pivoting movement of the bearing body relative to the bearing accommodation. With this pivoting movement a positive engagement is provided or a latching of the bearing body to the bearing accommodation.

To mention only one example (which is not intended to limit the present invention) the bearing body might be embodied as a hook or might comprise an U-shaped accommodation being open in the direction of the insertion orientation. Then, from the front the hook- or the U-shaped accommodation can be moved close to a transverse bolt forming the bearing accommodation. With the pivoting of the bearing body in the securing orientation then the positive engagement between the hook and the transverse bolt or the U-shaped recess in the direction of the securing orientation (which then during the operation corresponds to the crimping axis) is achieved.

It is possible that for the first variant by the pivoting movement of the bearing body from the insertion orientation into the securing orientation a positive engagement with an undercut of the bearing accommodation in the direction of the securing orientation is established which provides the support or bearing of the bearing body on the bearing accommodation against a disassembly.

For the first variant the mentioned positive engagement might be exclusively or additionally be effective for a securing in the direction of the securing orientation against a removal of the bearing body from the bearing accommodation.

For the first variant preferably no additional securing element is required so that the connection can exclusively be provided between the bearing body and the bearing accommodation which further simplifies the assembly and/or disassembly and which also reduces the number of the required components (where it is nevertheless possible to use an additional securing element).

For the first variant for the insertion in the insertion orientation and/or the pivoting in the securing orientation also an elastic deformation might occur or an elastic deformation of the relevant components is not required.

For the embodiments described in relation with the Figures for the first variant the bearing accommodation comprises a recess of the pliers jaw into which the bearing body enters. However, it is also possible that (for a corresponding design in other respects) the bearing body comprises a recess into which a protrusion of the bearing accommodation enters.

For one proposal related with the first variant the bearing accommodation comprises a bearing lug. Here, the bearing lug does not have a cross-section with a closed edge. Instead, the bearing lug comprises an edge opening. The edge opening forms a narrowing when compared to the bearing dimension of the bearing lug. The bearing body has a bearing cross-section which is supported (for being rotated) in the bearing lug. The bearing cross-section on the one hand comprises an insertion extension in a direction transverse to the insertion orientation. In a direction transverse to the securing orientation the bearing cross-section comprises a securing extension. The securing extension is larger than the narrowing of the bearing lug. When the bearing cross-section of the bearing body is arranged in the bearing lug of the bearing accommodation in the securing orientation the bearing cross-section and so the bearing body is not able to exit from the bearing lug because the bearing cross-section is not able to pass the narrowing with the securing extension. The securing extension might establish a positive engagement with an undercut formed by the narrowing of the bearing lug. Instead, the insertion extension is smaller than the narrowing of the bearing lug so that it is possible to insert the bearing body into the bearing lug when the bearing body has been brought into the insertion orientation so that the bearing cross-section is able to pass the narrowing of the bearing lug.

For the geometry of the bearing body and in particular the bearing cross-section being arranged in the bearing lug there are a lot of options for the first variant. For one proposal the bearing body comprises a cylinder segment portion and a flattening which define the bearing cross-section. The flattening might have any curvature or inclination unless the flattening is arranged within the outer surface of a cylinder continuing the cylinder segment portion. In the region of the cylinder segment portion then the bearing cross-section comprises the securing extension whereas in the region of the flattening the bearing cross-section comprises the insertion extension.

The two die half units are both assembled and disassembled to and from the associated bearing accommodation of the respective pliers jaw without the use of any tool.

Generally, the two die half units of the crimping pliers might have differing designs and might be adapted to the different required die half contours and/or also the different connections to the associated pliers jaws. The first die half unit and the second die half unit might have the same design which in particular serves for a symmetric crimping of the workpiece. In this case it is possible to reduce the number of different components.

The die half unit might comprise bearing bodies having different coupling sections. In this case, a first coupling section might allow a connection to a pliers jaw according to the first variant and a second coupling section allows the connection to the other pliers jaw according to the other variant. Here, preferably the two coupling sections are arranged one adjacent to the other when viewing along the pivot axis of the die half bearing. The two coupling sections provide that when connecting the first coupling section to a bearing accommodation of a first pliers jaw the pivot axis of the die half bearing relative to the die half unit is identical to the pivot axis of the die half bearing when connecting the second coupling section to a bearing accommodation of a second pliers jaw.

The invention also proposes a die half unit which is in particular designated for a use in crimping pliers as explained above. A die half unit of this type comprises a die half and a bearing body. The bearing body is designated for the establishment of a die half bearing by supporting the bearing body in a bearing accommodation of a pliers jaw. The die half unit further comprises a rotational bearing by which the die half is supported for being rotated relative to the bearing body about a crimping axis. Here, the bearing body is cumulatively embodied according to the following variants:

For the first variant the bearing body comprises a bearing cross-section which has a securing extension transverse to a securing orientation and an insertion extension transverse to an insertion orientation. The securing extension is here larger than the insertion extension. Preferably, the bearing body here comprises a cylinder segment portion, the diameter of the cylinder segment portion corresponding to the securing extension. Furthermore, the bearing body comprises a flattening wherein the bearing body comprises the insertion extension.

For the second variant the bearing body comprises a holding element. The holding element of the bearing body together with a bearing accommodation of a pliers jaw forms a holding device. In this case, the bearing accommodation comprises a counter-holding element. The holding element and the counter-holding element then form a latching or locking device.

For a die half unit the first variant and the second variant might cumulatively be embodied by a bearing body. Accordingly, the bearing body comprises two coupling sections for the coupling to the bearing accommodation of the pliers jaw, the two coupling sections e. g. being arranged one besides the other. One coupling section then provides the bearing cross-section comprising the securing extension and the insertion extension whereas the other coupling section comprises the locking element. A die half unit embodied in this way can then be connected to an associated pliers jaw both by the first variant of the connection as well as by the second variant of the connection.

The invention also proposes a method for the assembly of a die which comprises two die halves as explained before for establishing crimping pliers. In this method at first the first bearing body of the first die half unit is inserted with an orientation in the insertion orientation into the first bearing accommodation associated with the first pliers jaw. Subsequently the first bearing body is pivoted into the securing orientation so that an exit of the bearing body in the direction of the securing orientation is no longer possible. Subsequently, a second bearing body is inserted into the second bearing accommodation for holding the second bearing body and the second bearing accommodation by means of the latching or locking device. Here, the two die half units have preferably already been connected to each other prior to the execution of the aforementioned method steps and are guided relatively to each other in crimping direction or the two die half units are connected prior to the insertion of the second bearing body into the second bearing accommodation. When the second bearing body has been latched or locked in the second bearing accommodation, it is no longer possible to return the first bearing body again into the insertion orientation without a removal of the latching effect or the locking effect of the second bearing body with the second bearing accommodation. Accordingly, a disassembly of the two die half parts (together or one by one) is only possible if the locking or latching of the second bearing body in the second bearing accommodation is removed which preferably requires an unlatching or an unlocking by an actuation of a separate manual actuation of the counter-locking element.

Preferably, no further method steps are required for the assembly of the die half units to the associated pliers jaw (in particular no screwing, no assembly of a securing ring, no pressing or crimping and the like).

Advantageous developments of the invention result from the claims, the description and the drawings.

The advantages of features and of combinations of a plurality of features mentioned at the beginning of the description only serve as examples and may be used alternatively or cumulatively without the necessity of embodiments according to the invention having to obtain these advantages.

The following applies with respect to the disclosure—not the scope of protection—of the original application and the patent: Further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims which, however, does not apply to the independent claims of the granted patent.

The number of the features mentioned in the claims and in the description is to be understood to cover this exact number and a greater number than the mentioned number without having to explicitly use the adverb "at least". For example, if an element is mentioned, this is to be understood such that there is exactly one element or there are two elements or more elements. Additional features may be added to these features, or these features may be the only features of the respective product.

The reference signs contained in the claims are not limiting the extent of the matter protected by the claims. Their sole function is to make the claims easier to understand.

BRIEF DESCRIPTION OF THE DRAWINGS

In the following, the invention is further explained and described with respect to preferred exemplary embodiments illustrated in the drawings.

DETAILED DESCRIPTION

In the description of the Figures and in the Figures in same cases the same reference numbers are used for components and parts of the same which at least partially have corresponding designs and/or functions. Here, these components are partly distinguished from each other by the additional letter a, b, . . . . Then, reference is made to these components with the reference numbers with or without the additional letter a, b, . . . which then refers to one single component, a plurality of components labeled in this way or all of the components labeled with the reference number.

Figure 1:
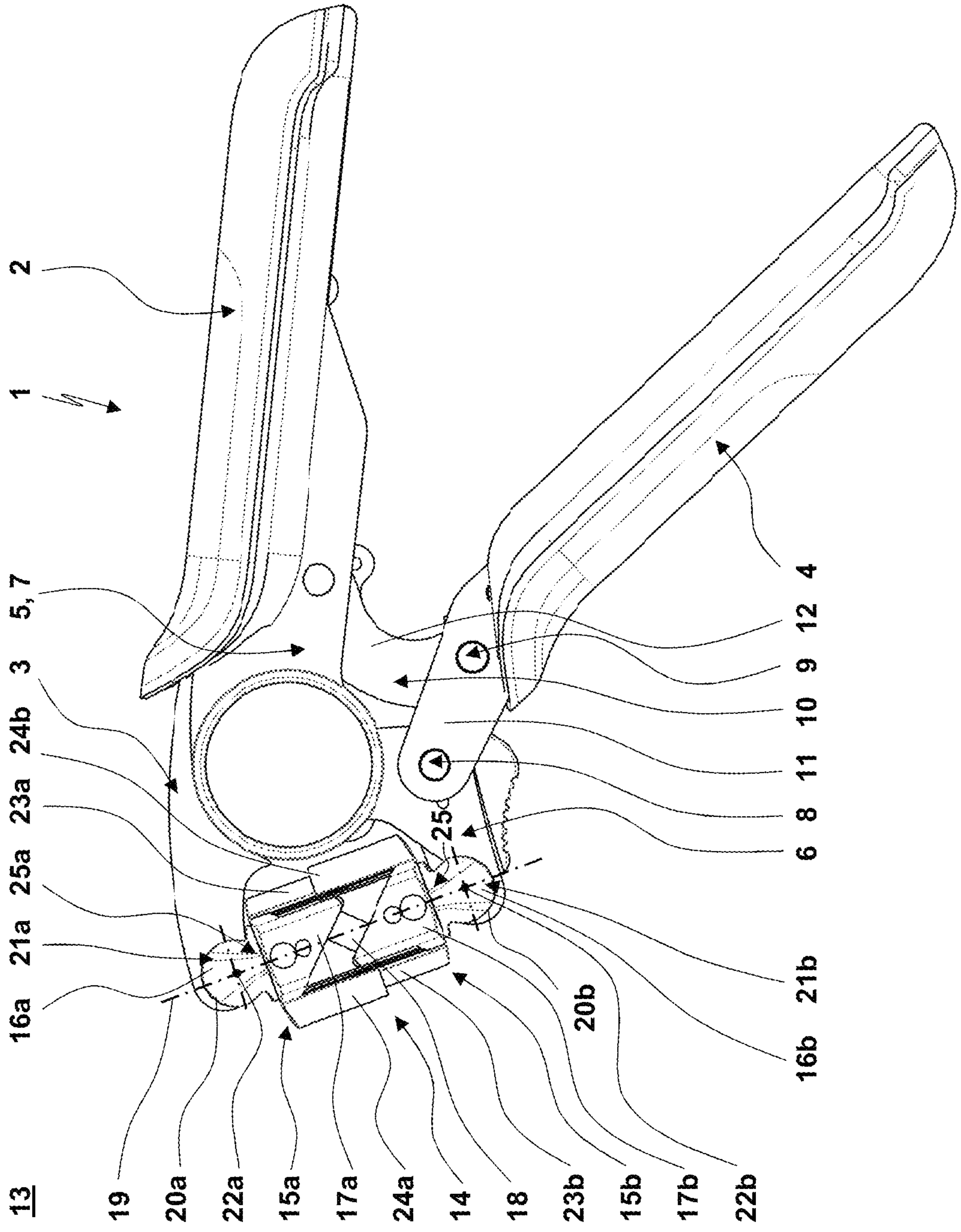
FIG. 1 shows crimping pliers in an open position.
Figure 2:
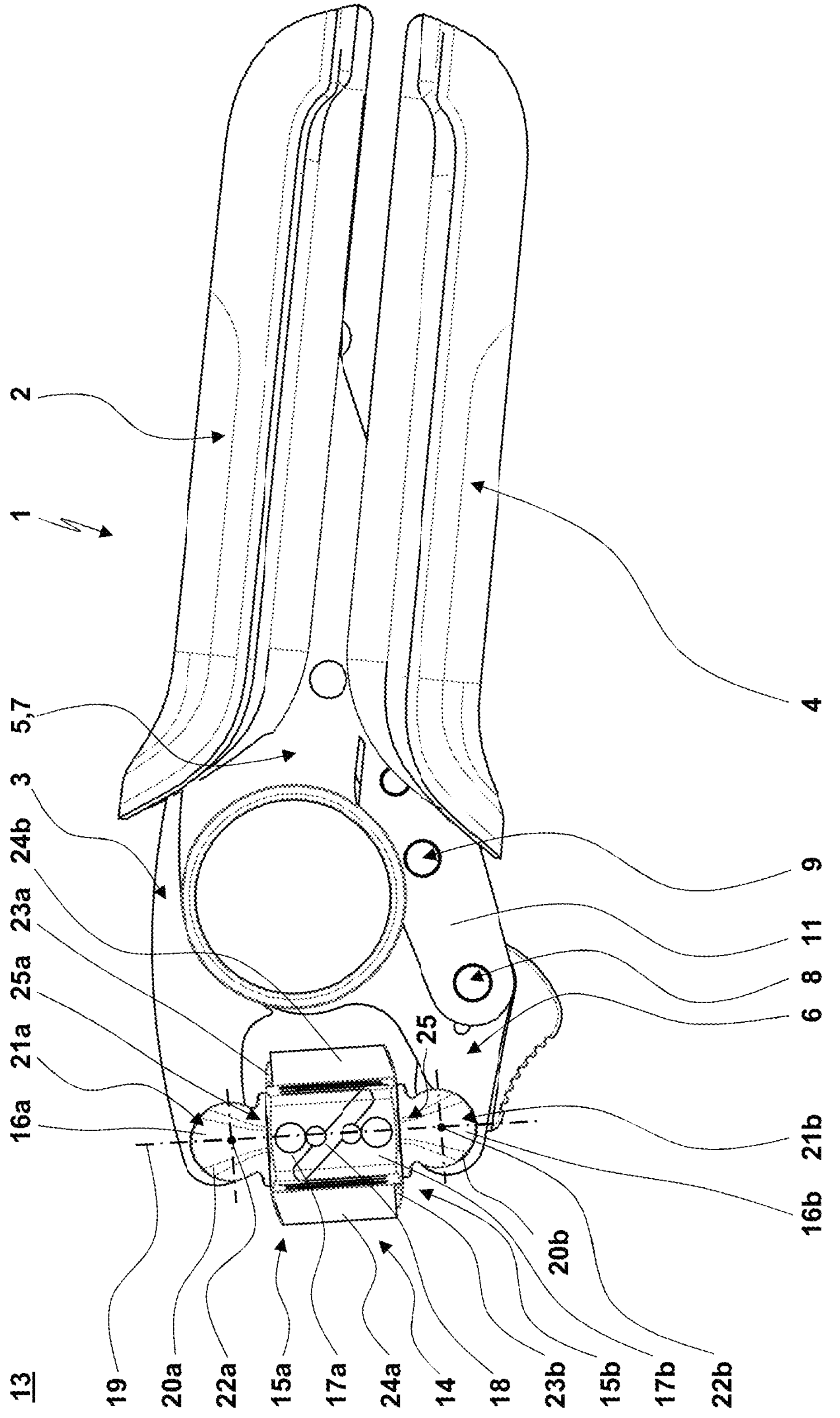
FIG. 2 shows the crimping pliers of FIG. 1 in a closed position.

FIG. 1 shows crimping pliers 1 in an open position whereas in FIG. 2 the crimping pliers 1 are shown in a closed position.

The crimping pliers comprise a fixed hand lever 2 which is fixedly connected to a fixed pliers jaw 3. Furthermore, the crimping pliers 1 comprise a moveable hand lever 4. The moveable hand lever 4 can be pivoted from the open position of FIG. 1 into the closed position of FIG. 2 by the application of manual forces by a hand of an user. During this closing movement the hand levers 2, 4 move towards each other. The moveable hand lever 4 is coupled to a moveable pliers jaw 6 by a drive mechanism 5. Over the closing stroke of the hand levers 2, 4 there is also a closing movement of the moveable pliers jaw 6. During the closing movement the pliers jaws 3, 6 move from an open position into a closed position. This movement provides the working stroke during the crimping process by which the workpiece is crimped.

The drive mechanism 5 provides a suitable transmission with a gear ratio of the movement and forces from the hand levers 2, 4 to the pliers jaws 3, 6. Here, the drive mechanism 5 might be embodied as any drive mechanism known from the prior art. Preferably, the drive mechanism 5 is a toggle level mechanism 7, For one possible embodiment of the toggle lever mechanism 7 the movable pliers jaw 6 is directly supported for being pivoted by a pivot joint on the fixed pliers jaw 3 (respectively a fixed pliers body which forms both the fixed pliers jaw 3 and also the fixed hand lever 2). The moveable hand lever 4 is linked by a pivot bearing 8 to the movable pliers jaw 6. Furthermore, an end region of a pressure lever 10 is linked by a toggle joint 9 to the movable hand lever 4. The other end region of the pressure lever 10 is linked by a pivot bearing to the fixed hand lever 2 (or to a fixed pliers body forming the fixed pliers jaw 3 and the fixed hand lever 2). Between the pivot bearing 8 and the toggle joint 9 the fixed hand lever 2 forms a first toggle lever 11 whereas the pressure lever 10 forms the second toggle lever 12.

The drawing plane of FIGS. 1 and 2 corresponds to a pliers head plane 13 wherein the hand levers 2, 4 are pivoted relative to each other, wherein the components of the drive mechanism 5 are moved and/or wherein the pliers jaws 3, 6 are moved. Also a crimping force is effective in the pliers head plane 13. Accordingly, a crimping axis 19 extends in the pliers head plane 13.

A die 14 is held by the pliers jaws 3, 6. The die 14 comprises two die half units 15*a*, 15*b*. The die half units 15 each comprise a bearing body 16 and a die half 17. The die halves 17 each form die half contours which limit a die accommodation 18. The workpiece can be introduced into the die accommodation 18. During the crimping process the workpiece is crimped in the die accommodation 18 between the die contours of the die halves 17. This is provided by a relative movement of the die halves 17 along the crimping axis 19.

The orientation of the crimping axis 19 changes during the crimping process relatively to the pliers jaws 3, 6. For that purpose the bearing bodies 16 of the die half units 15 together with bearing accommodations 20 of the pliers jaws 3, 6 form die half bearings 21. The die half bearings 21 provide a pivoting degree of freedom between the bearing bodies 16 and the associated pliers jaw 3, 6 about a pivot axis 22 having an orientation vertical to the pliers head plane 13.

The die halves 17 each comprise a guiding protrusion 23 on one side adjacent to the die accommodation 18 and a guiding recess 24 on the other side adjacent to the die accommodation 18. The guiding protrusion 23*a* of the die half 17*a* is received in the guiding recess 24*b* of the other die half 17*b* under the provision of a guiding effect. In a corresponding way the guiding protrusion 23*b* of the die half 17*b* is received in the guiding recess 24*a* of the die half 17*a* under the provision of a guiding effect. In this way on both sides from the die accommodation 18 a guidance of the die halves 17 parallel to the crimping axis 19 is provided so that during the crimping process an orientation of the die halves 17*a*, 17*b* relative to each other according to the demands is upheld.

A connection of the bearing body 16 to the associated die half 17 is provided by means of a rotational bearing 25 in a way such that the die half 17 can be rotated relative to the bearing body 16 about the crimping axis 19.

Due to the die half bearing 21 the bearing body 16 has only one pivoting degree of freedom about the pivot axis 22 relative to the associated pliers jaw 3, 6. Due to the rotational bearing 25 the die half 17 only has one rotational degree of freedom about the crimping axis 19 relative to the bearing body 16. Finally, due to the guidance by the guiding protrusions 23 and the guiding recesses 24 the two die halves 17 only have one translational degree of freedom along the crimping axis 19. Due to the coupling of the two die halves 17 by this guidance the die halves 17 can only be rotated in common about the crimping axis 19.

Figure 3:
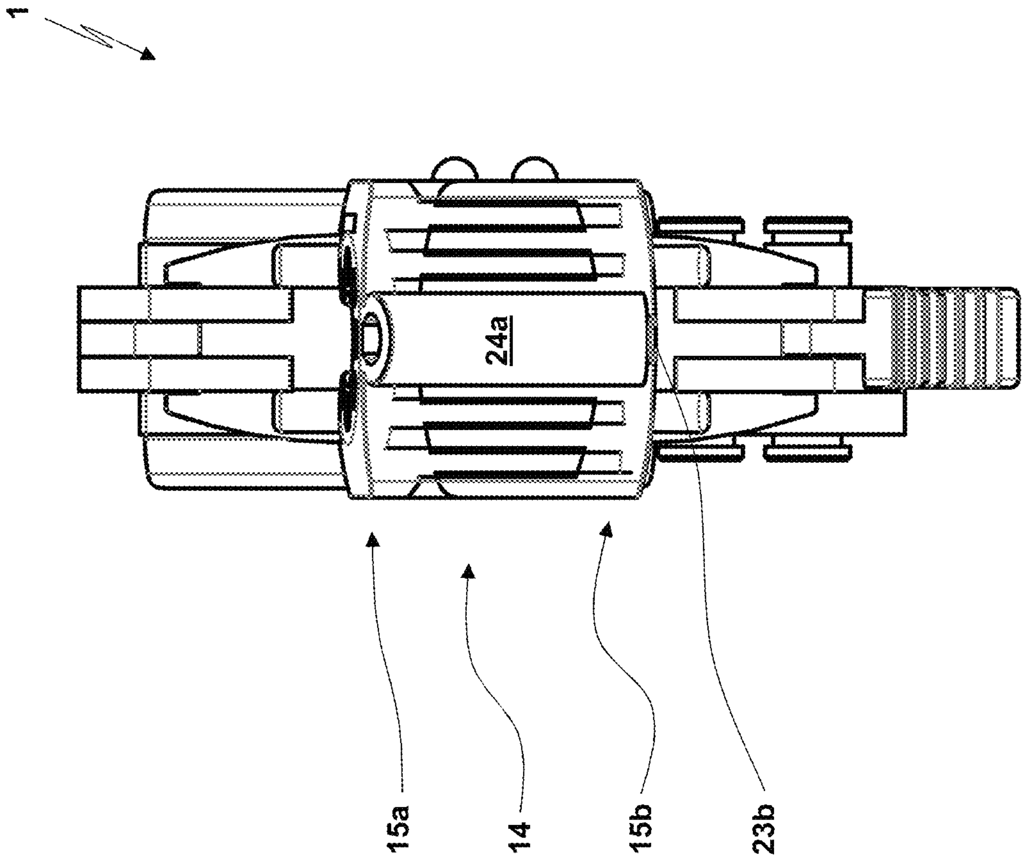
FIG. 3 in a three-dimensional frontal view shows the crimping pliers of FIGS. 1 and 2 in the region of a die formed by two die half units.

FIG. 3 shows a frontal view of the crimping pliers 1 in the region of the die 14. In this view on the one hand the comb-typed engagement of the two die halves 17 can be seen. Furthermore, here it can be seen that the guiding recesses 24 have a design with guiding bores and the guiding protrusions 23 have a design with guiding rods.

Figure 4:
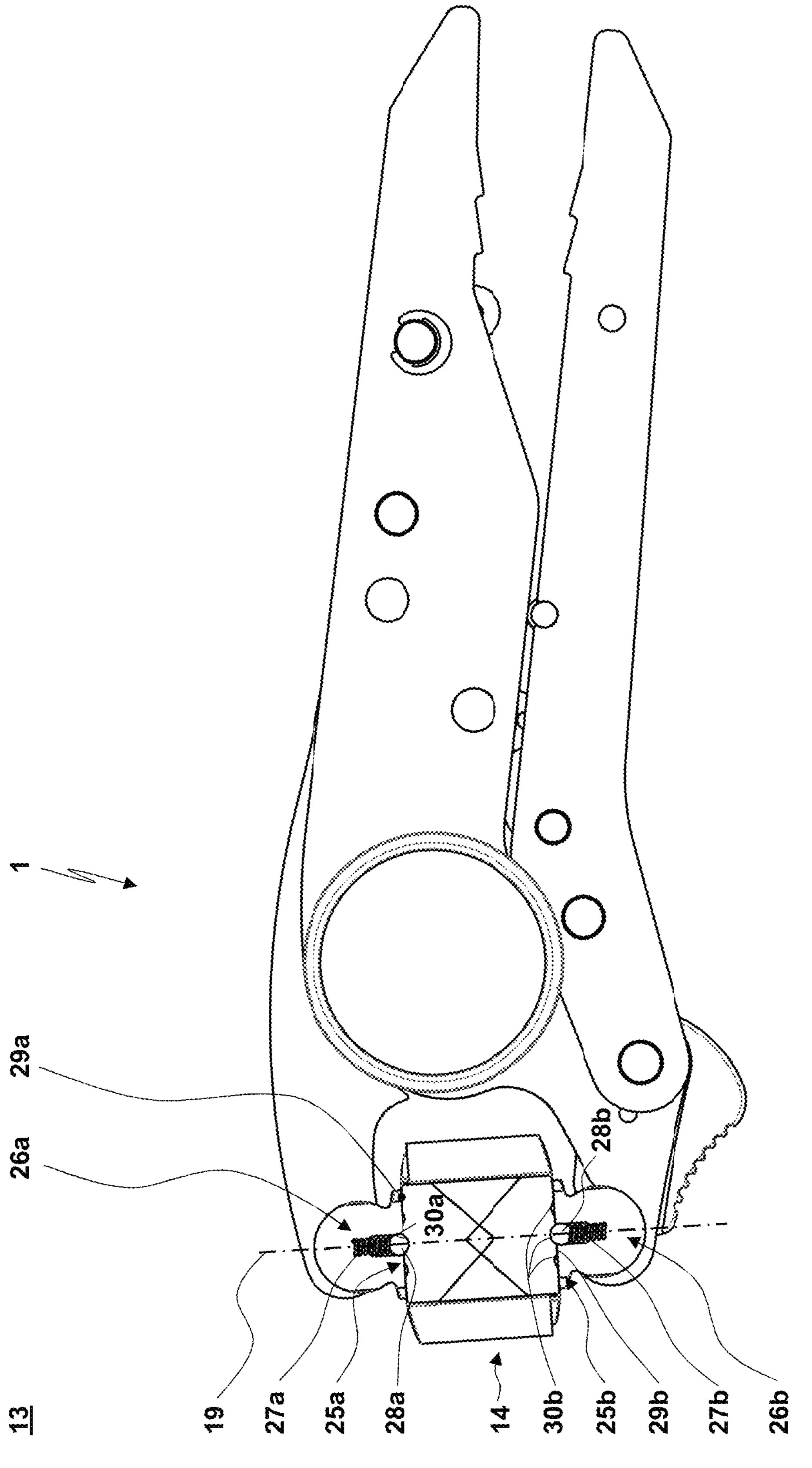
FIG. 4 in a partial sectional view shows the crimping pliers of FIGS. 1 and 3 in a closed position showing a latching device for a latching of a rotational position of the die halves.

FIG. 4 shows latching devices 26 by which it is possible to latch the rotational position of the die halves 17 relative to the bearing bodies 16 about the crimping axis 19. The latching devices 26 comprise a latching spring 27 and a latching sphere 28. The latching spring 27 and the latching sphere 28 are here accommodated in a recess or bore of the bearing body 16 having an orientation parallel to the crimping axis 19. The latching spring 27 biases the latching sphere 28 towards a front face 29 of the die half 17. Latching recesses 30 are provided in the front face 29. The latching spheres 28 are able to latch in the latching recesses 30 due to the bias by the latching spring 27. A number of latching recesses 30 is dispersed or arranged over the circumference so that it is possible to latch the die half 17 in different rotational angles relative to the bearing body 16. Preferably, at least one latching effect is provided for a lateral orientation of the die accommodation 18 (so for an orientation of the longitudinal axis of the die accommodation 18 vertical to the pliers head plane 13) as well as for a frontal orientation of the die accommodation 18 (so for an orientation of the longitudinal axis of the die accommodation 18 within the pliers head plane 13).

Figure 5:
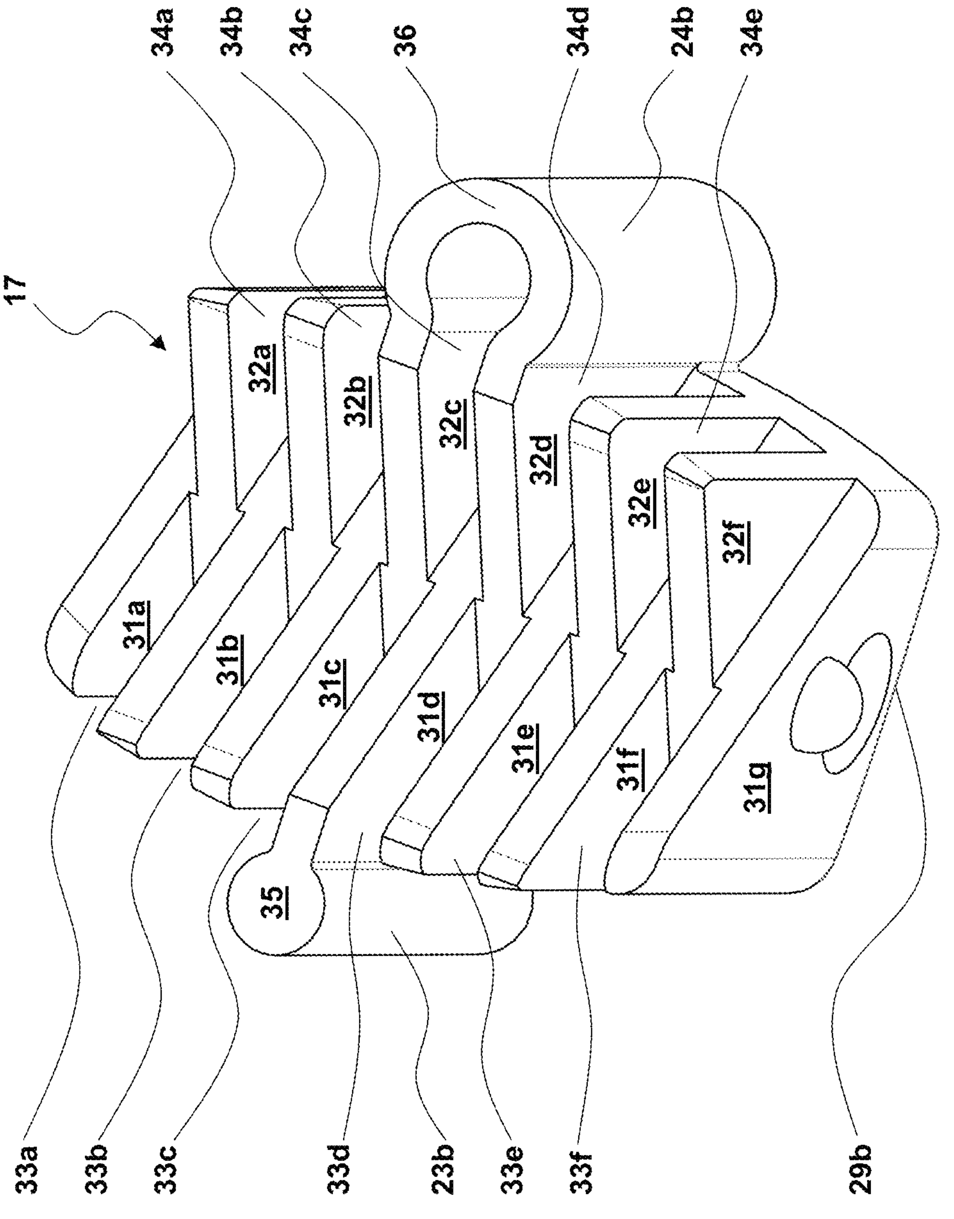
FIG. 5 in a three-dimensional view shows a die half usable in crimping pliers of FIGS. 1 to 4.

FIG. 5 shows a die half 17*b* in a three-dimensional view. Here, it can be seen that the die halves 17 comprise a plurality of pairs of ribs 31*a*, 31*b*, . . . and 32*a*, 32*b*, . . . being plate-shaped and arranged parallel to each other as well as accommodating spaces 33*a*, 33*b* . . . and 34*a*, 34*b*, . . . between the ribs 31, 32. When inserting the die half 17*b* according to FIG. 5 in a comb-like fashion into a correspondingly designed die half 17*a* (which however has an inverted orientation) the ribs 31 of the die half 17*a* enter into accommodating spaces 34 of the die half 17*b* whereas the ribs 32 of the die half 17*a* enter into the accommodating spaces 33 of the die half 17*b*. In a reversed fashion the ribs 31, 32 of the die half 17*b* enter into the accommodating spaces 33, 34 of the die half 17*a*. The die contours provided by the front faces of the ribs 31, 32 limit the die accommodation 18. During the crimping process the ribs 31, 32 enter further into the accommodating spaces 33, 34 which makes the die accommodation 18 smaller and provides a crimping of the workpiece in the die accommodation. The engaging interaction of the parallel ribs 31, 32 of the two die halves 17 with each other is provided in a way such that the ribs 31, 32 are able to slide along each other with a small play or also without any play. The comb-like engagement of the ribs 31, 32 into each other provides a guidance along the crimping axis 19. The guidance blocks a relative movement of the die halves 17 relative to each other along the surface normal of the ribs 31, 32. An additional guidance between the die halves 17 is provided by the guidance of the guiding protrusions 23 in the guiding recesses 24.

For the embodiment shown in FIG. 5 the guiding protrusion 23 is formed by a thickening 35 of a rib 33*d* (here arranged in the middle). For the shown embodiment the thickening 35 has a cylinder-shape or the shape of a cylinder segment.

For the embodiment shown in FIG. 5 the guiding recess 24 is formed by a hollow cylinder segment 36 which attaches to the end regions of the ribs 33*c*, 33*d* between which the rib 31*d* with the thickening 35 is accommodated.

Figure 6:
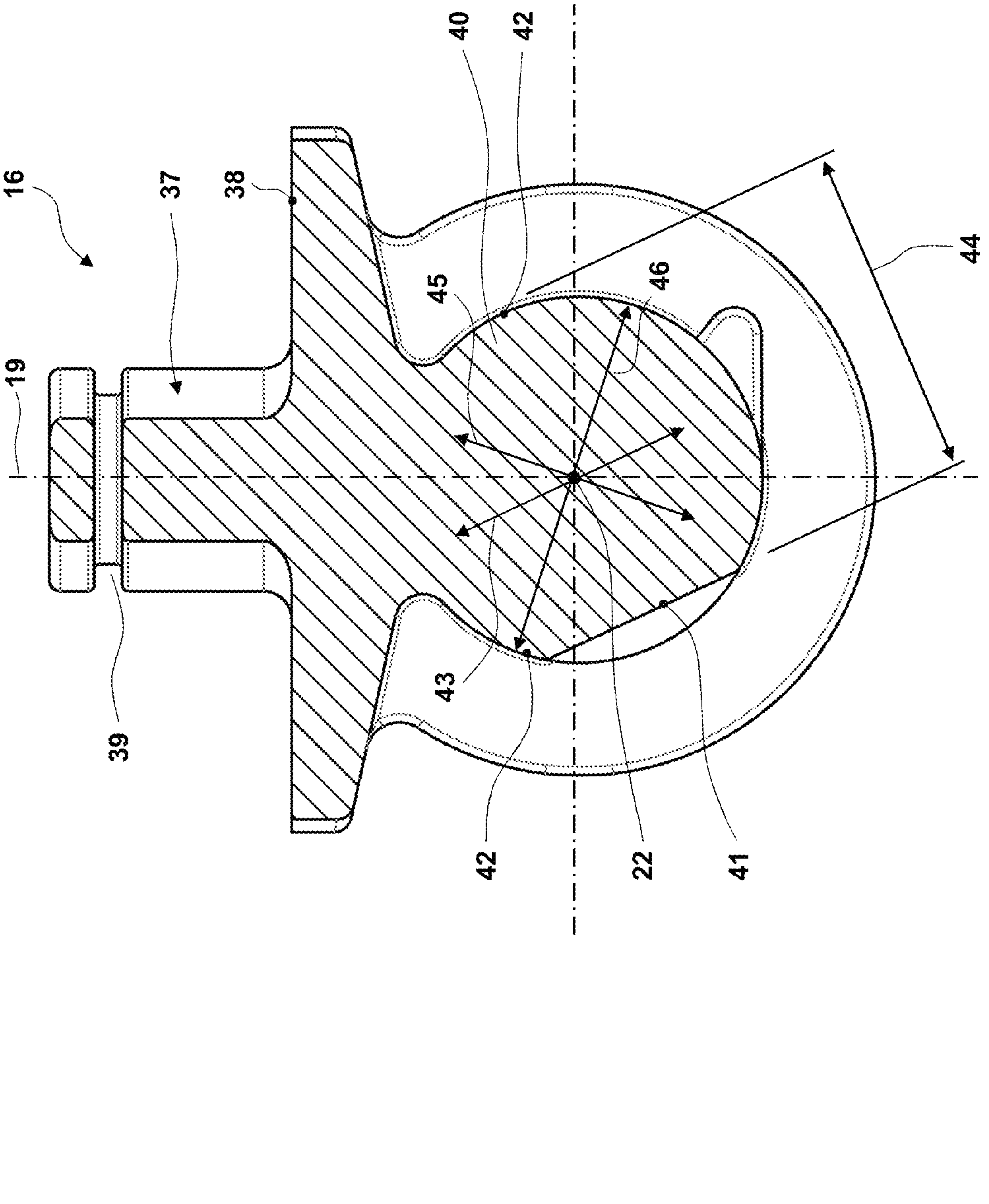
FIG. 6 in a first sectional view shows a bearing body which can be used in crimping pliers of FIGS. 1 to 4 which shows the bearing cross-section of the bearing body for a connection according to the first variant.
Figure 7:
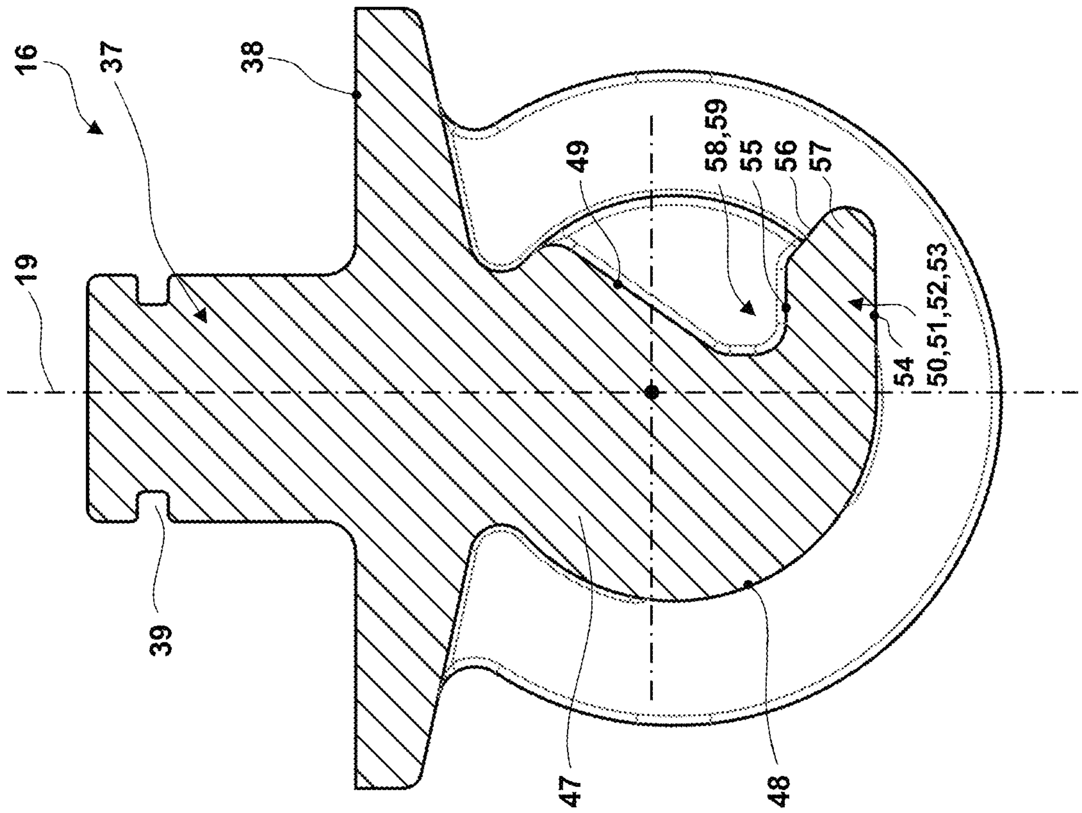
FIG. 7 in a second sectional view shows the bearing body of FIG. 6 which shows a bearing cross-section for a connection according to the second variant, the sectional views of FIGS. 6 and 7 being taken in parallel planes.

FIGS. 6 and 7 show a bearing body 16 in different parallel sectional views, namely in a first partial sectional view according to FIG. 6 and in a second partial sectional view according to FIG. 7. The partial sectional views of FIGS. 6 and 7 provide alternative coupling or holding options on the same bearing body 16 for the connection to a bearing accommodation 20 of a pliers jaw 3, 6.

Figure 8:
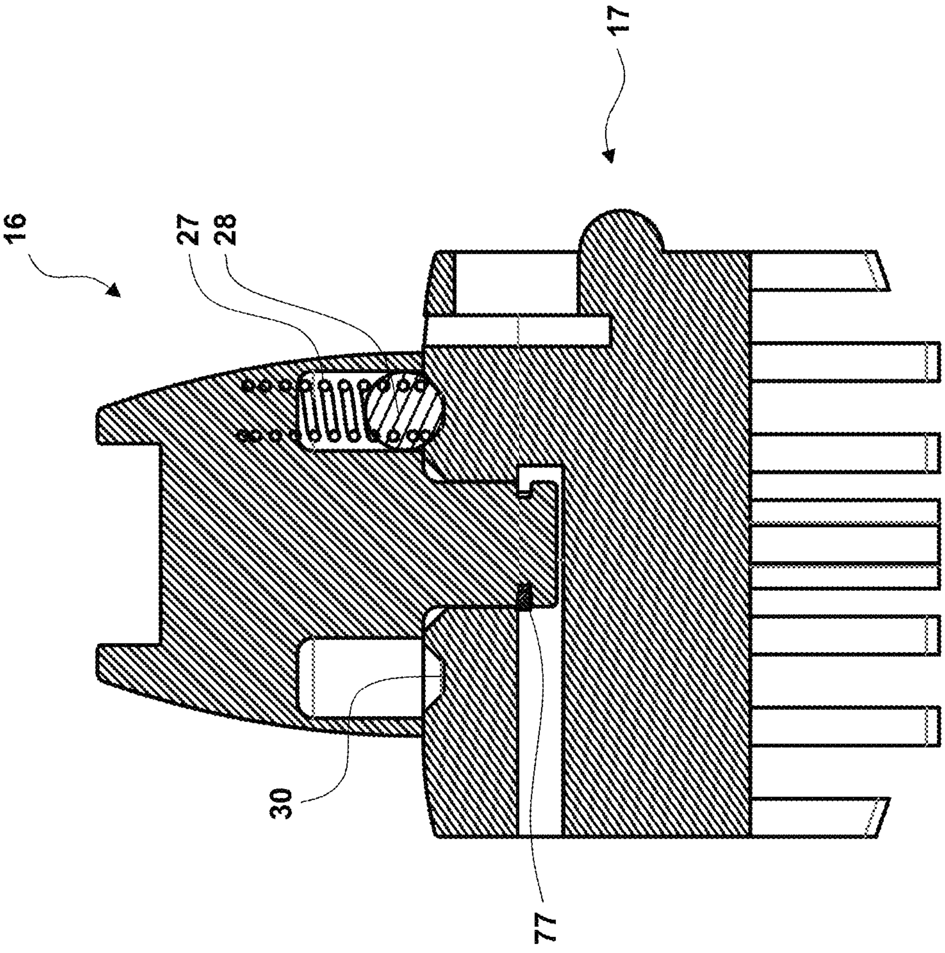
FIG. 8 in a sectional view shows a die half unit comprising a bearing body of FIGS. 6 and 7 and a die half of FIG. 5.
Figure 9:
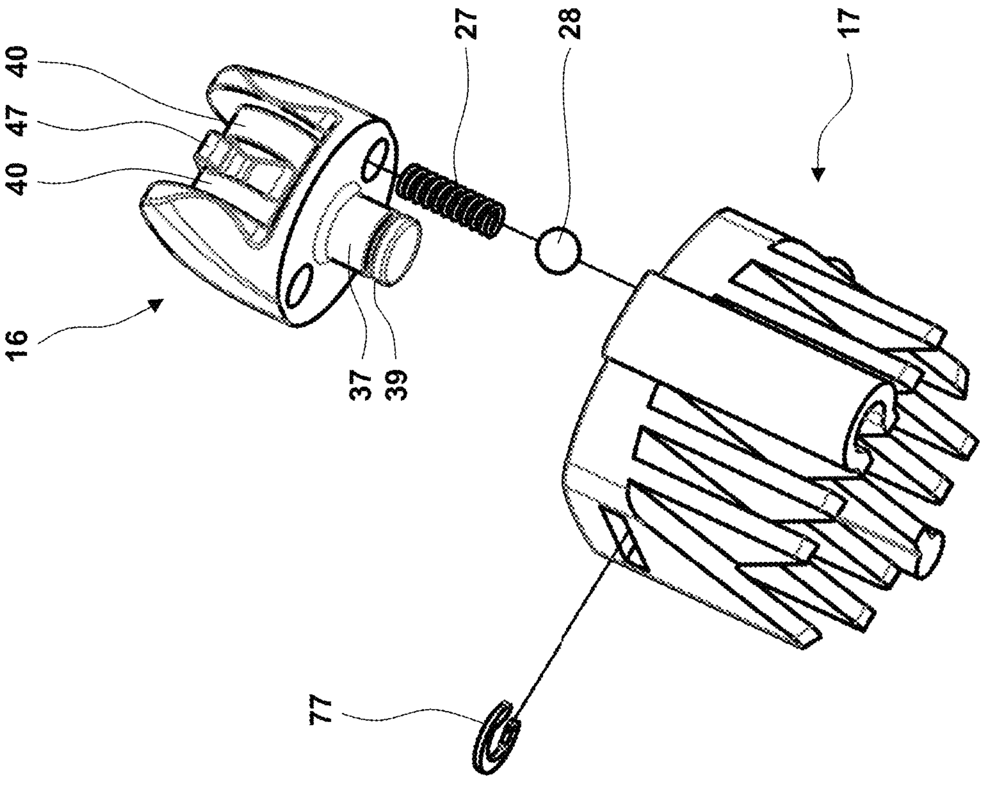
FIG. 9 in an exploded view shows the die half unit of FIG. 8.
Figure 10:
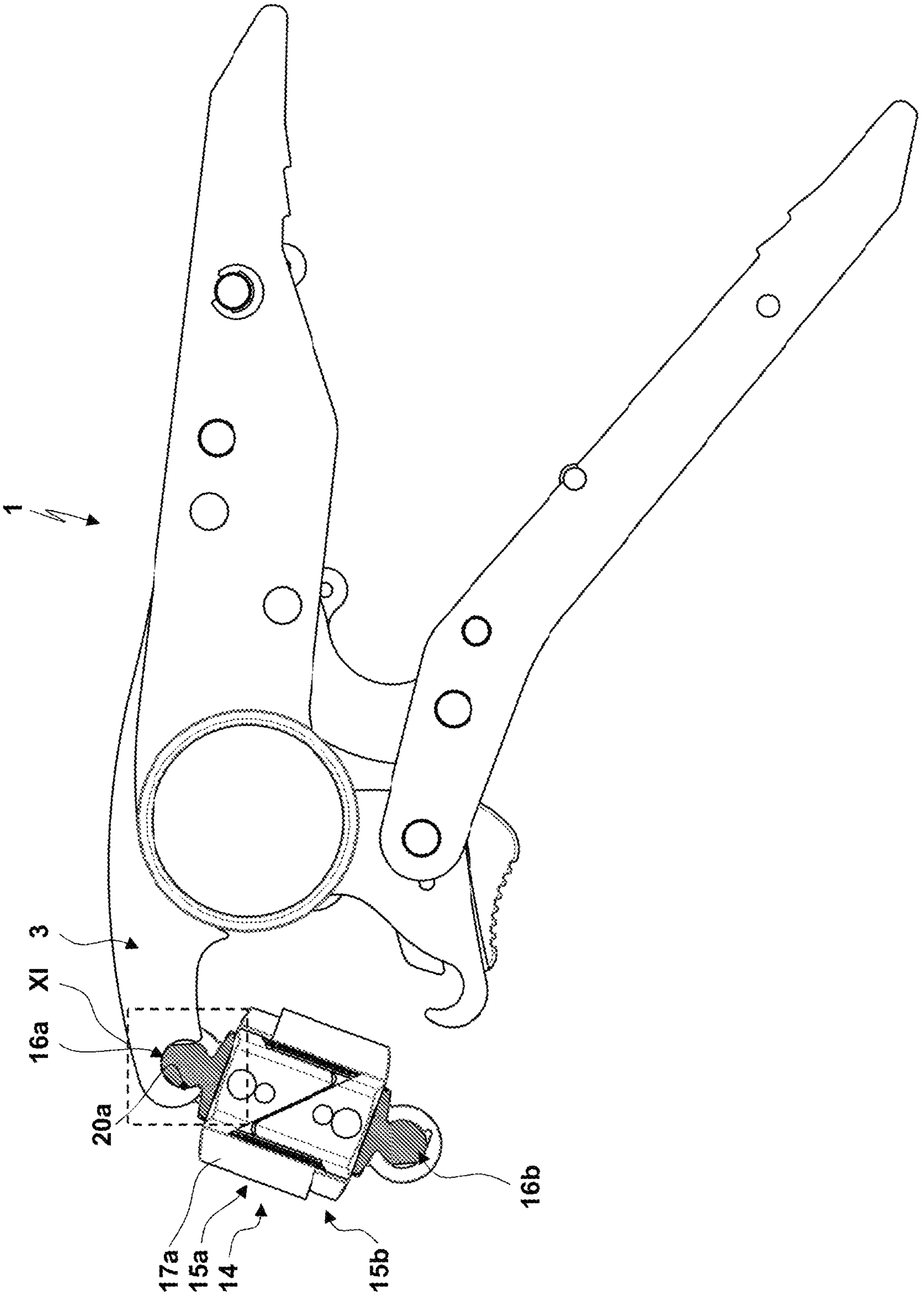
FIG. 10 shows an assembly of a die to a first pliers jaw of crimping pliers according to the first variant with an insertion of a bearing cross-section of the first bearing body of FIG. 6 into a first bearing accommodation.
Figure 11:
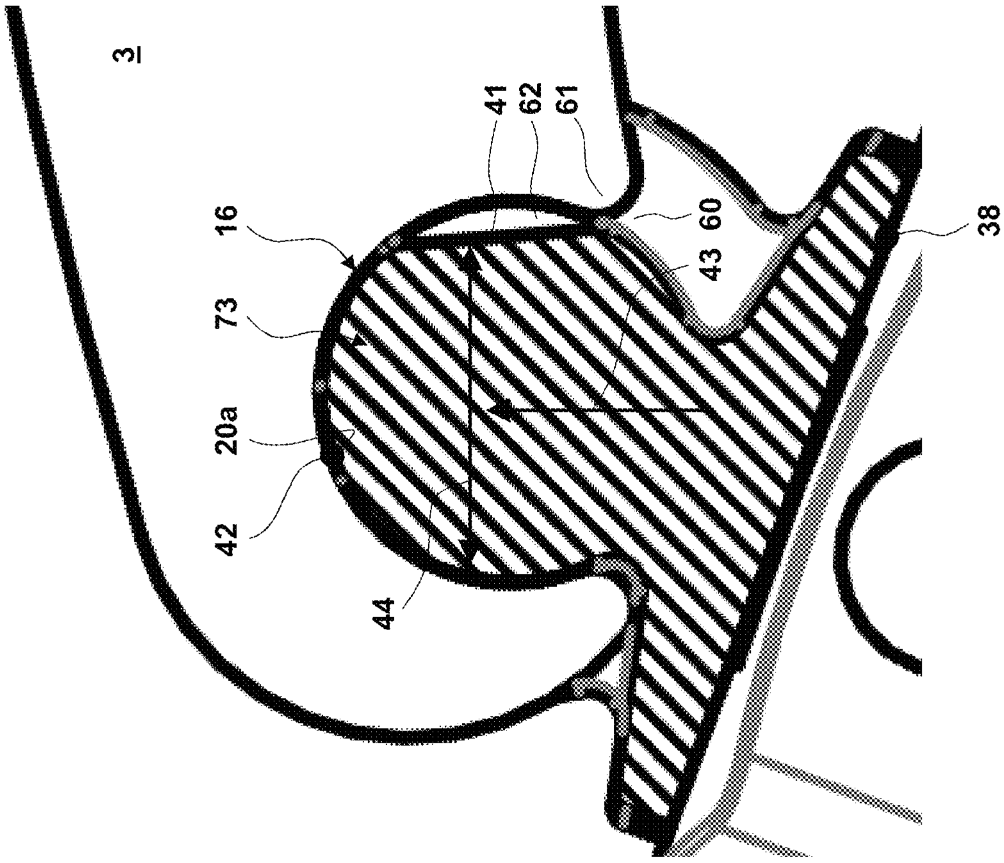
FIG. 11 shows a detail XI of the crimping pliers of FIG. 10 in the region of the connection of the first bearing body to the first bearing accommodation.
Figure 12:
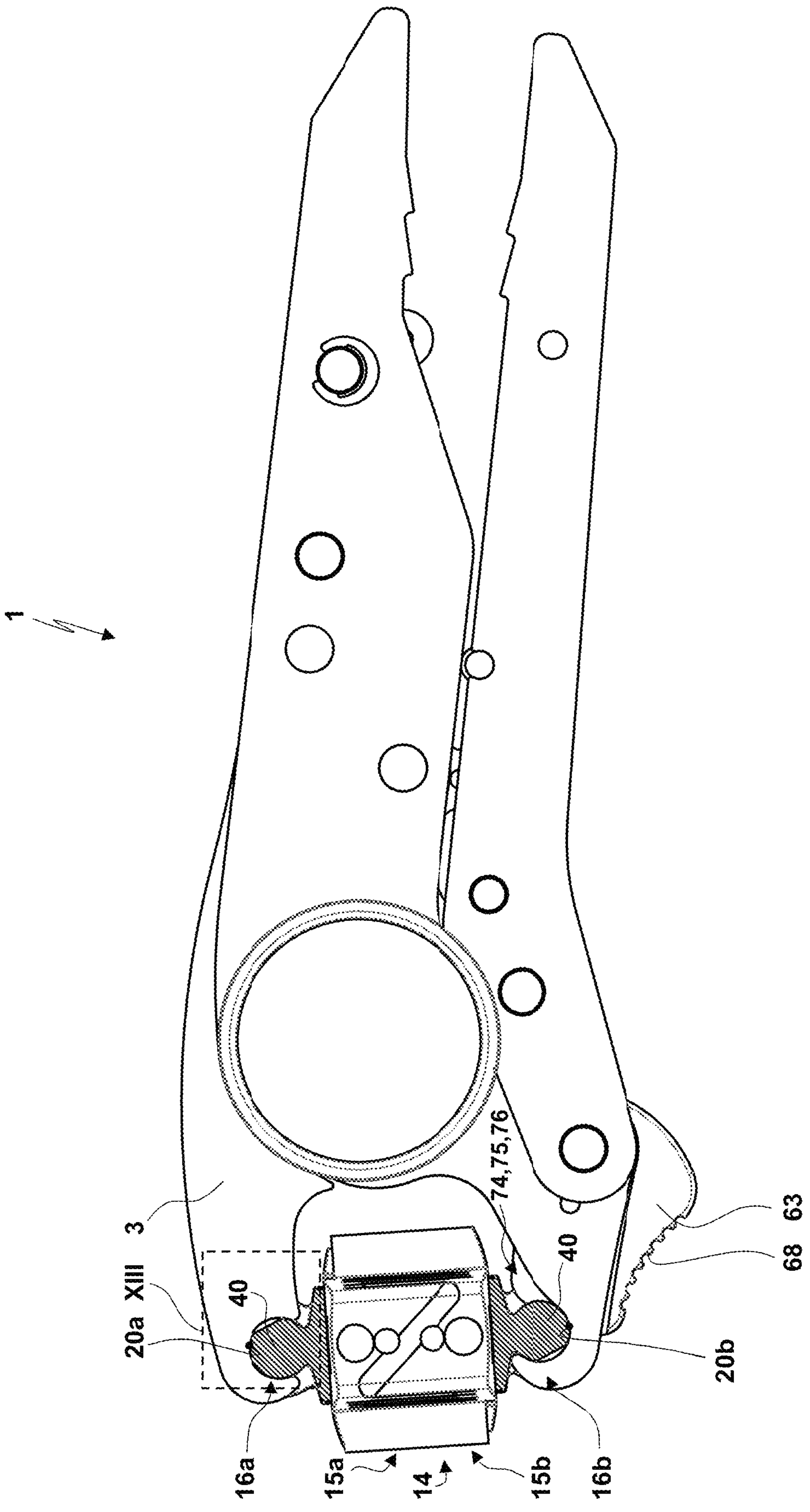
FIG. 12 shows the crimping pliers of FIGS. 10 and 11 after the pivoting of the first bearing body relative to the first bearing accommodation of the first pliers jaw and also after the assembly of the die half unit according to the second variant to the second pliers jaw with the entry of the bearing cross-section of the second bearing body of FIG. 7 into the second bearing accommodation of the second pliers jaw under the establishment of a latching or locking device.
Figure 13:
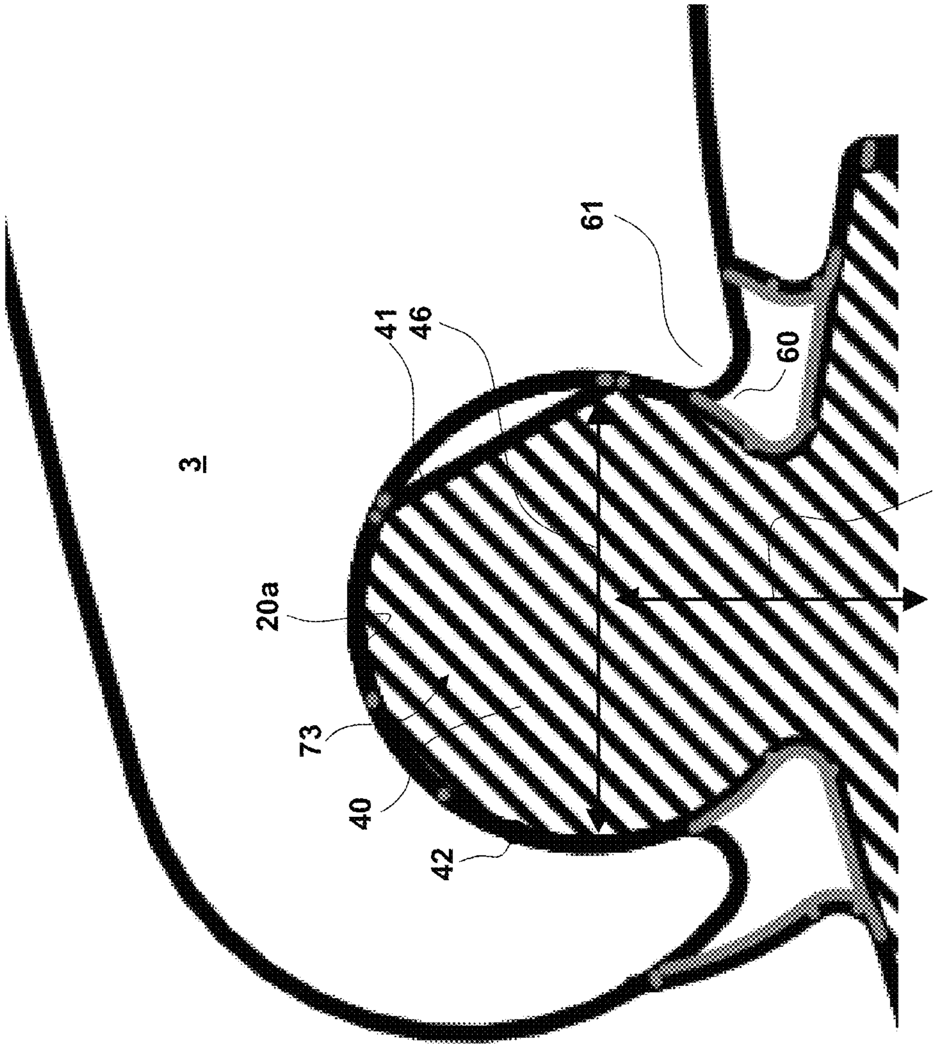
FIG. 13 shows a detail XIII of the crimping pliers of FIG. 12 in the region of the first bearing body and the first bearing accommodation.

The bearing body 16 comprises a stud-shaped protrusion 37 which attaches to a supporting surface 38. In the end region facing away from the supporting surface 38 the protrusion 37 comprises a circumferential groove 39. The stud-shaped protrusion 37 can be inserted into an accommodating bore 78 initiating from the front surface 29 of the die half 17 and is guided in the accommodating bore 78 for rotating about the crimping axis 19 for the establishment of a rotational bearing 25. In the state inserted in this way into the die half 17 the bearing body 16 is secured on the die half 17 by a securing ring or any other securing element 77 against an undesired re-exit. The securing ring or the securing element 77 is accommodated in the circumferential groove 29 of the bearing body 16 and is supported on a supporting surface provided by the die half 17. The die half 17 is accordingly captured between securing element 77 in the circumferential groove 39 and the supporting surface 38 (cp. FIGS. 8 and 9). The contact of the supporting surface 38 of the bearing body 16 with the die half 17 provides a good transfer and a transfer with a large surface area of the crimping force between the bearing body 16 and the die half 17.

In the cross-sectional view of FIG. 6 the bearing body 16 comprises a bearing cross-section 40. In the bearing cross-section 40 the bearing body 16 comprises a flattening 41 and a cylinder segment portion 42 or cylinder segment portions 42 arranged on both sides of the flattening 41.

In a direction transverse to an insertion orientation 43 the bearing cross-section 40 comprises an insertion extension 44 which is defined by the flattening 41. Instead, the bearing cross-section 40 comprises a securing extension 46 in a direction transverse to a securing orientation 45. The securing extension 46 is larger than the insertion extension 44. Here, the securing extension 46 might correspond to the diameter of the cylinder segment portion 42. For a securing orientation 45 differing from that of FIG. 6 the securing extension 46 might also be (slightly) smaller than the diameter of the cylinder segment portion 42 if the securing extension 46 is formed in an end region of the flattening 41. The insertion orientation is parallel to the flattening whereas the securing orientation 45 is inclined relative to the insertion orientation 43 and might e. g. in the assembled state have an orientation along the crimping axis 19 or the longitudinal axis of the protrusion 37. Also different bearing cross-sections 40 are possible. The flattening 41 might e. g. be domed and/or instead of the cylinder segment portions 42 any other outer contours of the bearing cross-section 40 can be used as long as it provided that the rules for the dimensions of the insertion extension 44 and the securing extension 46 as explained above still apply.

In the sectional view shown in FIG. 7 it can be seen that in this cross-section the bearing body 16 comprises a bearing cross-section 47. Also here, the bearing cross-section 47 comprises at least one cylinder segment portion 48 and a flattening 49. However, the protrusion 50 of the bearing cross-section 47 forms a holding element 51 which might form a latching element 52 and/or a locking element 53. It is possible that (as shown) the bearing cross-section 47 has a design as a hook. The protrusion 50 extends on the side of the bearing cross-section 47 facing away from the protrusion 37 with a transverse surface 54 having an orientation transverse to the longitudinal axis of the protrusion 37 and parallel to the supporting surface 38.

On the side facing away from the protrusion 37 the holding element 51 comprises a transverse surface 54, the transverse surface 54 having an orientation transverse to the longitudinal axis of the protrusion 37. Also on the side facing towards the protrusion 37 the holding element 51 comprises a transverse surface 55 of this type. However, in the outer end region the transverse surface 55 continues to an inclined surface 56 which again via a rounded nose 57 continues into the transverse surface 55. In the region of the transverse surface 55 the nose 57 establishes an undercut 58. In the region of the undercut 58 a latching recess or locking recess 59 is formed for providing a latching or locking effect.

FIGS. 10 to 13 show the assembly of the bearing body 16*a* of the die half unit 15*a* to the bearing accommodation 20 of the fixed pliers jaw 3 in the region of the bearing cross-section 40. The bearing accommodation 20 of the fixed pliers jaw 3 here comprises a cross-section with a bearing surface shaped as cylinder segment. The circumferential angle of the cylinder segment of the bearing surface is here more than 180° (e. g. 200° to 260° or 220° to 250°). The cross-section of the bearing accommodation 20 comprises an edge opening 60 located at a position remote from the cylinder segment shaped bearing surface. The edge opening 60 forms a narrowing 61 of the bearing accommodation 20 so that an undercut 62 is formed between the narrowing 61 in the interior of the bearing accommodation 20. In this way the bearing accommodation 20 forms a bearing lug 73 having a cross-section with an open edge.

The edge opening 60 is slightly larger than the insertion extension 44 of the bearing cross-section 40 of the bearing body 16. Accordingly, it is possible to introduce the bearing body 16 in its insertion orientation 43 through the edge opening 60 into the bearing accommodation 20 with a movement along the insertion orientation 43. For avoiding a re-exit of the bearing body 16 from the bearing accommodation 20 the bearing body 16 is pivoted from the insertion orientation 43 of FIG. 11 into the securing orientation 45 of FIG. 13. Due to the fact that the securing extension 46 which comes into effect is larger than the dimension of the edge opening 60 due to the narrowing 41 the bearing body 16 is not able to exit from the bearing accommodation 20 in the direction of the securing orientation 45. When the die 14 has been completely assembled to the pliers jaw 3, 6 the bearing body 16 is no longer able to be returned into the insertion orientation 43 during the operation of the crimping pliers 1 without a further disassembly so that an undesired re-exit of the bearing body 16 from the bearing accommodation 20 is not possible. In the assembled position of FIGS. 12 and 13 the bearing cross-section 40 of the bearing body 16 is supported by the cylinder segment portion 42 with the crimping force on the cylinder-segment-shaped bearing surface of the bearing accommodation 20. Accordingly, the effective crimping force is supported in a good way and with a large surface area between the bearing body 16 and the bearing accommodation 20. Instead, any forces acting in removal direction are in a reliable way supported by supporting the securing extension 46 due to the undercut 62 formed by the narrowing 61 on the material of the pliers jaw 3 forming the narrowing 61.

Within the frame of the present description this type of connecting the bearing cross-section 40 of FIG. 6 to a bearing accommodation 20 is also denoted as "first variant" of the connection or bearing. For the first variant the connection or bearing is preferably exclusively provided between the pliers jaw 3 and the bearing body 16 without an additional component being required for providing the connection or bearing.

A second variant for the connection or bearing can be seen from FIGS. 14 to 17. For the shown embodiment the second variant is cumulatively used to the use of the first variant, namely for the support of the second die half unit 15*b* on the moveable pliers jaw 6.

A counter-holding element 63 is guided for being displaced in a locking or latching direction 64 relative to the moveable pliers jaw 6. Preferably, the latching or locking direction 64 has an orientation transverse to the longitudinal axis of the protrusion 37 or transverse to the crimping axis 19. The guidance of the counter-holding element 63 is here provided by two studs 65, 66 which are held by the pliers jaw 6 and which are guided in an elongate hole 67 of the counter-holding element 63. Due to the given constructional space for the shown embodiment the studs 65, 66 have different diameters so that here the guiding elongate hole 67 comprises subsections with different widths corresponding to the different diameters of the studs 65, 66.

The counter-holding element 63 comprises an actuation surface 68 which is freely accessible for the user from the outside of the crimping pliers 1. By means of actuation forces manually applied by the user on the actuation surface 68 it is possible to move the counter-locking element 63 between a locking position and a released position. Preferably, the actuation can be induced by the user by biasing the actuation surface 68 with the end portion of the thumb which might even be the case when the hand is positioned on at least one of the hand levers 2, 4.

Figure 14:
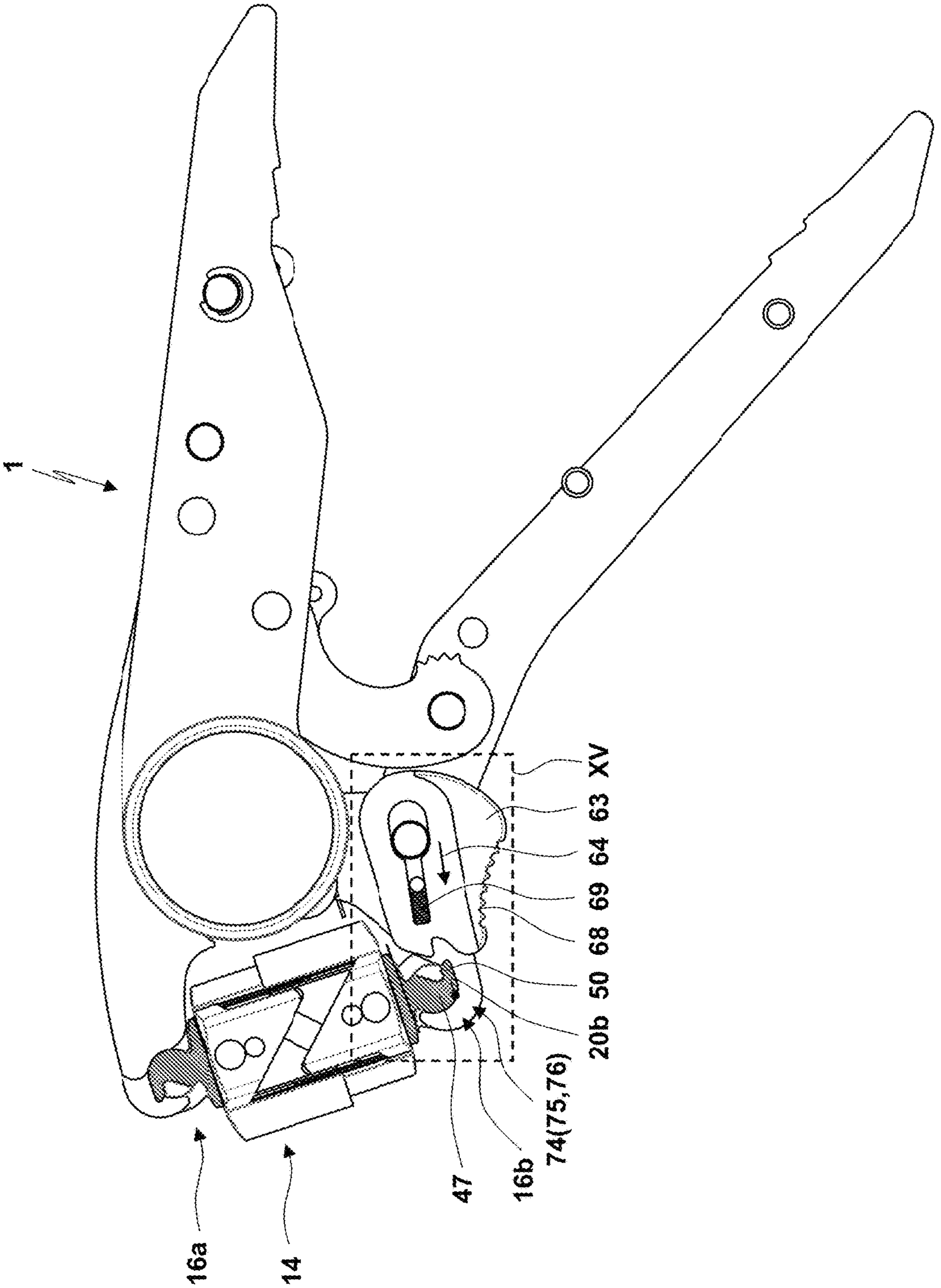
FIG. 14 shows the assembly of the second die half unit to the second pliers jaw of the crimping pliers of FIGS. 10 and 12 by means of a holding device which here is in the released position.
Figure 15:
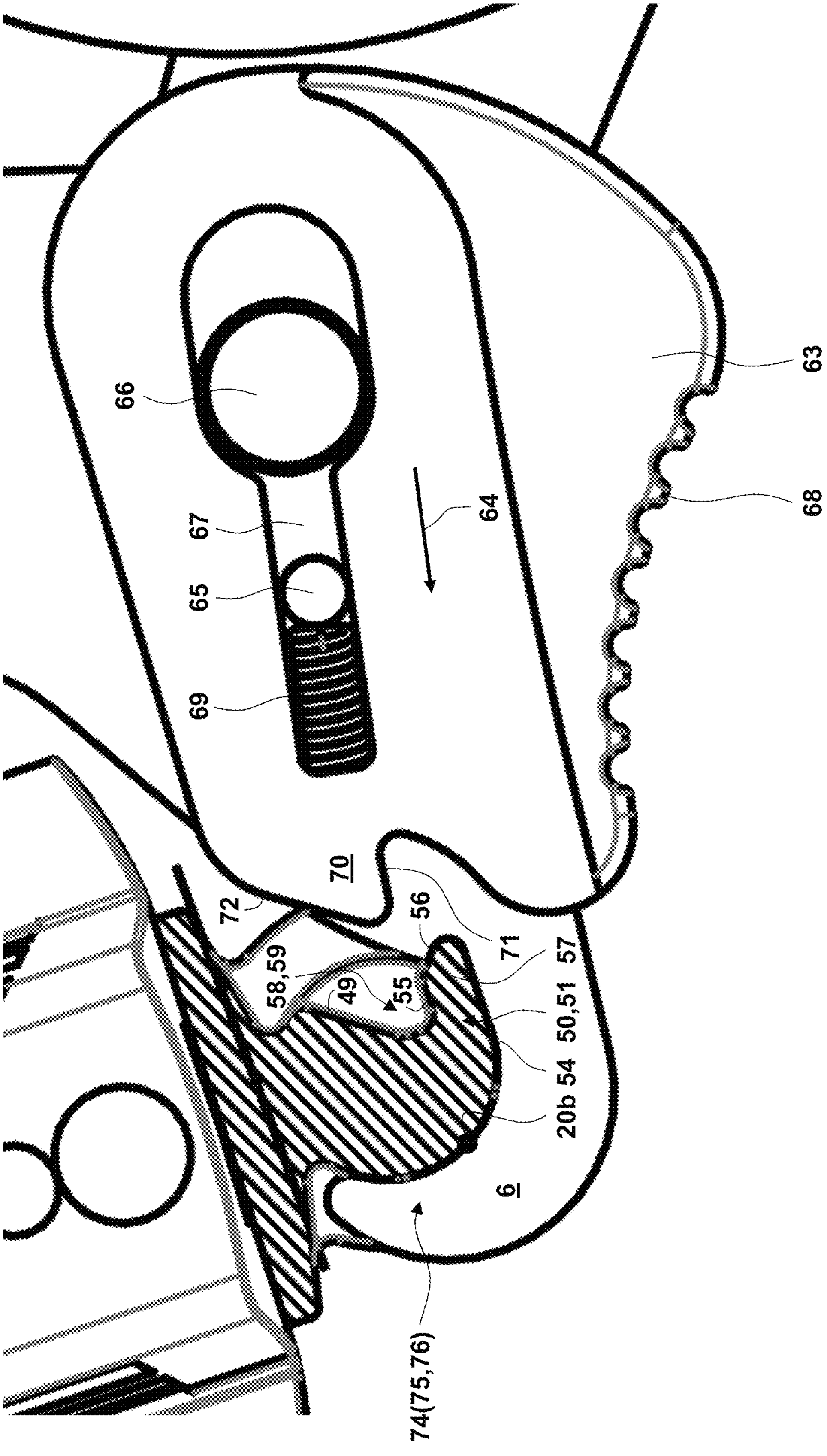
FIG. 15 shows a detail XV of the crimping pliers of FIG. 14 in the region of the holding device.
Figure 16:
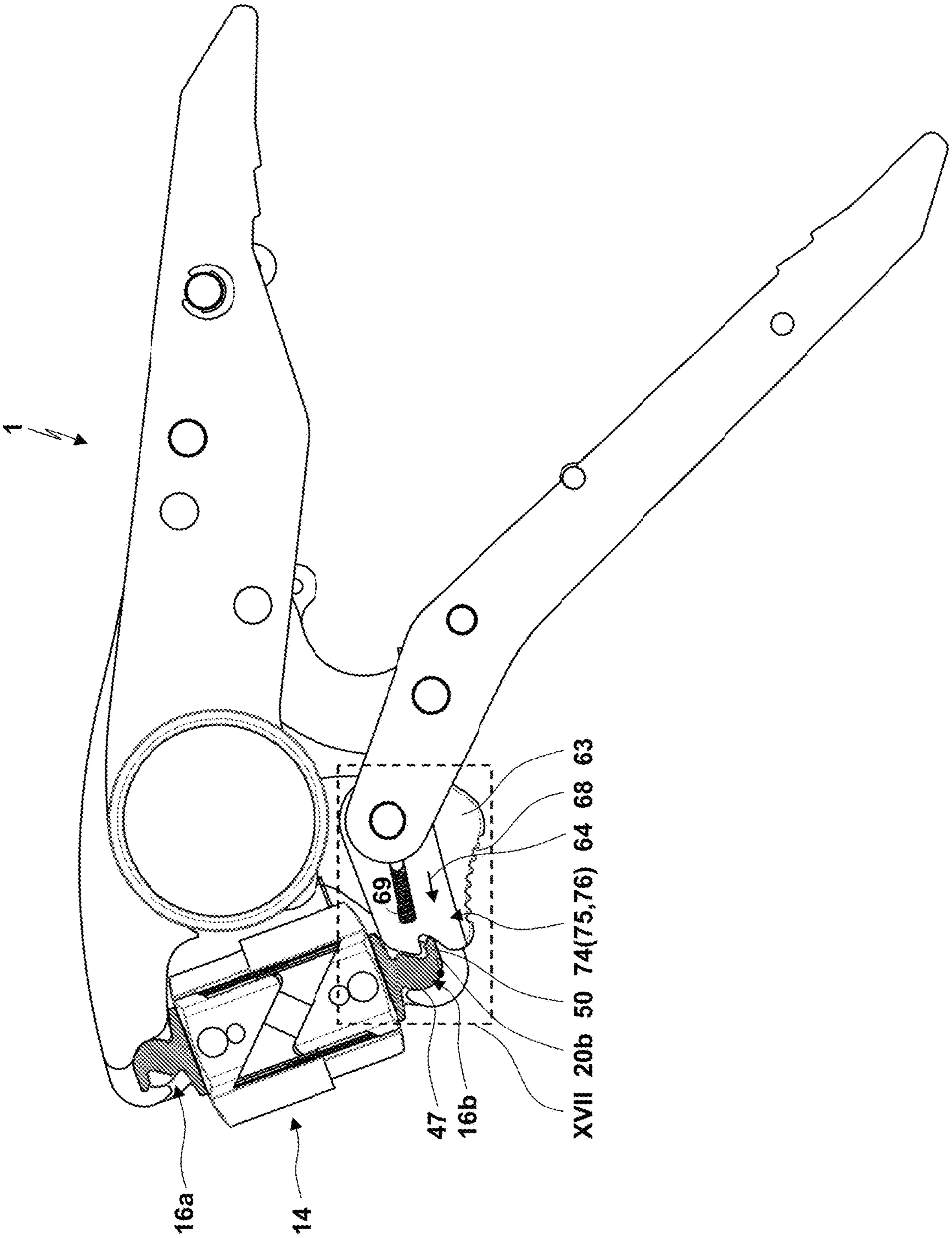
FIG. 16 shows the assembly of the second die half unit to the second pliers jaw of the crimping pliers of FIGS. 10 and 12 by means of a holding device which is here in the holding position.
Figure 17:
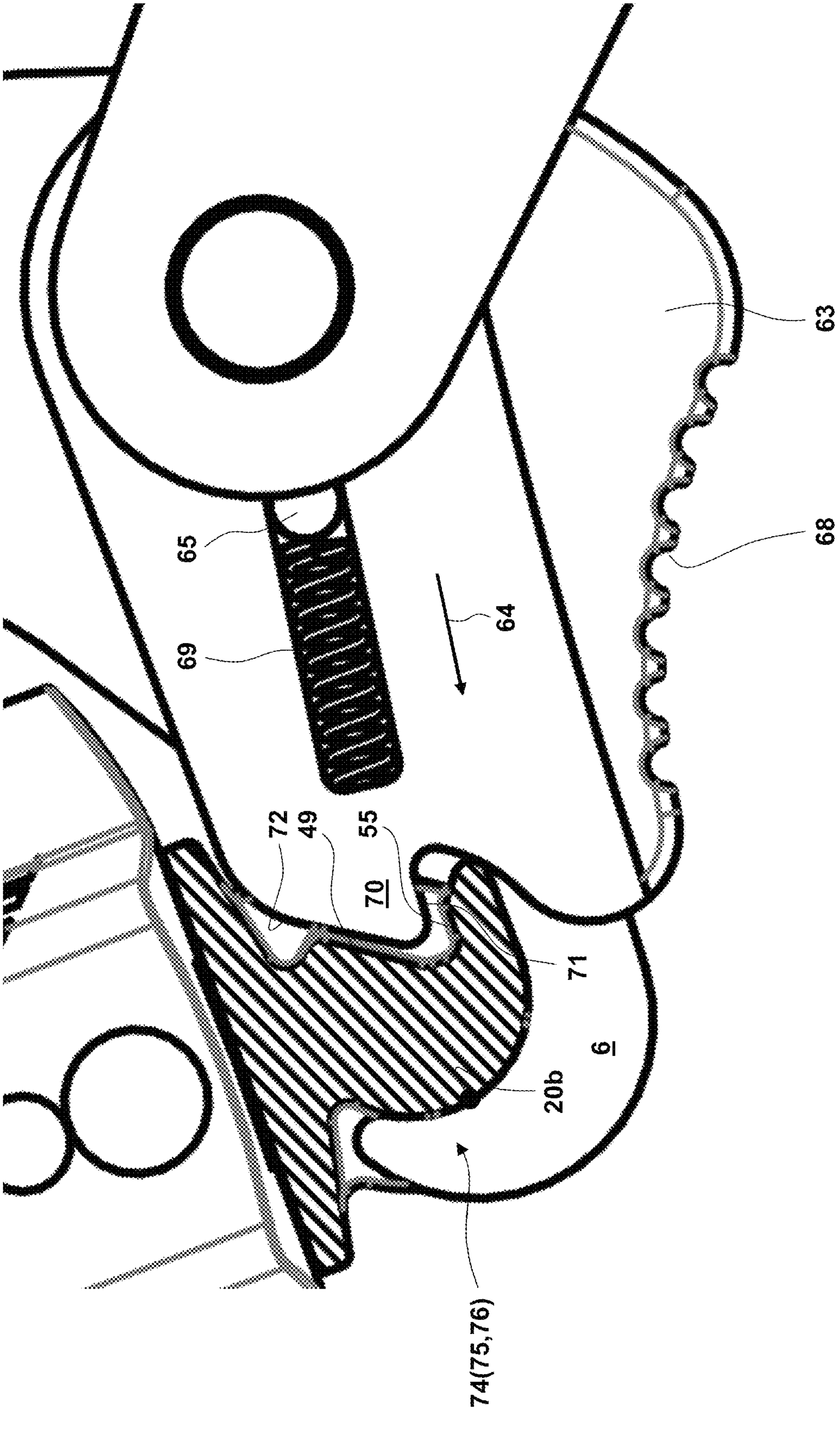
FIG. 17 shows a detail XVII of the crimping pliers of FIG. 16 in the region of the holding device.

The counter-holding element 63 is biased by the holding spring 69 from the released position of FIGS. 14 and 15 towards the holding position of FIGS. 16 and 17. In the region of the front face the counter-holding element 63 comprises a counter-holding nose 70 which is biased by the holding spring 69 towards the bearing cross-section 47 of the bearing body 16.

Together with the counter-holding element 63 (here the counter-holding nose 70) the pliers jaw 6 forms the bearing accommodation 20. When the counter-holding element 63 is in the released position of FIGS. 14 and 15 the counter-holding element 63 allows the entry of the bearing cross-section 47 of the bearing body 16 into the bearing accommodation 20. In the position shown in FIGS. 14 and 15 the bearing cross-section 47 contacts the cylinder-segment-shaped bearing surface of the bearing accommodation 20 (provided by the pliers jaw 6) with the cylinder segment portion 48 and the transverse surface 54. During the operation of the crimping pliers 1 a crimping force is supported in a reliable way and with a large surface area by this contact surface. However, the bearing body 16 might re-exit from the bearing accommodation 20 in the released position of the counter-holding element 63. In order to avoid that the bearing body 16 exits in this way the holding spring 69 moves the counter-holding element 63 into the holding position of FIGS. 16 and 17. In the holding position the counter-holding nose 70 engages in the recess 69. The counter-holding nose 70 engages behind the undercut 62 of the bearing cross-section 47. A transverse surface 71 of the counter-holding element 63 contacts the transverse surface 55 of the holding element 51 of the bearing body 16 with a surface area. If a removal force biases the bearing body 16, the removal force (having an orientation of the crimping force or parallel to the longitudinal axis of the protrusion 37) is supported by the contact of the transverse surfaces 55, 71 without biasing the counter-holding element 63 with a force component acting towards the released position. Accordingly, here a locking applies.

As an optional feature the bearing cross-section 47 cannot only be introduced into the bearing accommodation 20 when the counter-holding element 63 has been moved manually against the bias by the holding spring 69 into the released position of FIGS. 14, 15. For this option the counter-holding element 63 comprises an inclined surface 72. When the counter-holding element 63 is in the holding position and the bearing body 16 is inserted into the bearing accommodation 20, the rounded nose 57 of the bearing body 16 contacts the inclined surface. An insertion force applied by the user on the bearing body 16 is converted by the inclined surface 72 into a force component which acts opposite to the bias of the counter-holding element 63 by the holding spring 69. A sufficient insertion force can so lead to the automatic movement of the counter-holding element 63 from the holding position towards the released position for successively freeing the entry into the bearing accommodation 20. When with the entry of the bearing body 16 the end position in the bearing accommodation 20 has been reached, the counter-holding element 63 snaps back into the holding position due to the bias by the holding spring 69. Accordingly, for this embodiment a holding device 74 for inserting the bearing cross-section 47 into the bearing accommodation 20 is embodied as a latching device whereas the holding device 74 forms a locking device 76 against a removal of the bearing cross-section 47 from the bearing accommodation 20, the removal only being allowed when manually moving the counter-holding element 63 from the holding position into the released position.

In the case that for a modification also the transverse surfaces 55, 71 are embodied as inclined surfaces, it is also possible to allow an unlatching of the connection between the bearing cross-section 47 and the bearing accommodation 20.

The connection of the bearing body 16 and the bearing accommodation 20 of the pliers jaw 6 is in the frame of the present description also denoted as "second variant". For the second variant, the connection or bearing is preferably not exclusively provided between the pliers jaw 6 and the bearing body 16. Instead, at least one additional component embodied at the counter-holding element 63 is required for the provision of the connection or bearing. For a modified embodiment, it is however also possible that the counter-holding element 63 is integrally formed by the pliers jaw 6 or the bearing body 16, e.g. by forming a holding nose as an integral, elastically supported component of the pliers jaw 6 or the bearing body 16.

It is generally possible that (differing from the shown embodiment) the connection of the die 14 to the fixed pliers jaw 3 is provided by the holding device 74 whereas the connection to the moveable plies jaw 6 is provided by the bearing cross-section 40 having the flattening 41.

It is possible that the bearing cross-section 37 is arranged between two bearing cross-sections 40 so that for the connection according to the first variant a symmetric support is possible in the region of the two bearing cross-section 40 (cp. FIG. 9).

Many variations and modifications may be made to the preferred embodiments of the invention without departing substantially from the spirit and principles of the invention. All such modifications and variations are intended to be included herein within the scope of the present invention, as defined by the following claims.

We claim:

1. Crimping pliers comprising a die with a first die half unit supported on a first pliers jaw and a second die half unit supported on a second pliers jaw, wherein a) the first die half unit comprises a first die half and a first die half bearing formed by a first bearing body, which is supported in a first bearing accommodation of the first pliers jaw, the first die half being supported by a first rotational bearing for being rotated about a crimping axis relative to the first bearing body, the first die unit being designed and configured such that the first bearing body can be inserted in an insertion orientation into the first bearing accommodation, the first bearing body can be pivoted in the first bearing accommodation by a pivoting movement from the insertion orientation into a securing orientation wherein the first bearing body forms a secure engagement with the first bearing accommodation in the direction of the securing orientation, and the first bearing body of the first die half unit can be assembled and disassembled to and from the first bearing accommodation of the first pliers jaw without a use of a tool, and b) the second die half unit comprises a second die half and a second die half bearing formed by a second bearing body which is supported in a second bearing accommodation of the second pliers jaw, the second die half being supported by a second rotational bearing for being rotated about the crimping axis relative to the second bearing body, the second bearing body and the second bearing accommodation being connected to each other by a latching or locking device, the second bearing body of the second die half unit can be assembled and disassembled to and from the second bearing accommodation of the second pliers jaw without a use of a tool, wherein the second bearing accommodation comprises a recess which is limited by the second pliers jaw and a counter-holding element, the counter-holding element being movable between a holding position wherein the second bearing body is blocked by the counter-holding element from an exit from the recess, and a release position wherein the second bearing body is able to exit from the recess, c) the crimping pliers being designed and configured such that the first bearing body cannot be transferred into the insertion orientation when the crimping pliers are completely assembled without at least partially disassembling the crimping pliers.

2. The crimping pliers of claim 1, wherein the second bearing body and the second bearing accommodation are connected to each other a) by a latching connection when inserting the second bearing body into the second bearing accommodation or b) by a locking connection against an exit of the second bearing body from the second bearing accommodation.

3. The crimping pliers of claim 1, wherein the counter-holding element comprises an inclined surface being inclined relative to an insertion direction for inserting the second bearing body into the second bearing accommodation so that due to assembly forces applied to the second bearing body at the inclined surface a force biases the counter-holding element which induces a movement of the counter-holding element into the release position.

4. The crimping pliers of claim 1, wherein the counter-holding element comprises an inclined surface being inclined relative to a removal direction for removing the second bearing body from the second bearing accommodation so that due to disassembly forces applied to the second bearing body at the inclined surface a force biases the counter-holding element which induces a movement of the counter-holding element into the release position.

5. The crimping pliers of claim 1, wherein the counter-holding element comprises a transverse surface which has an orientation transverse to an insertion direction for inserting the second bearing body into the second bearing accommodation.

6. The crimping pliers of claim 1, wherein the counter-holding element comprise a transverse surface which has an orientation transverse to a removal direction for removing the second bearing body from the second bearing accommodation.

7. The crimping pliers of claim 1, wherein the counter-holding element is guided to be displaced relatively to the second pliers jaw and the counter-holding element is supported by a holding spring on the second pliers jaw.

8. The crimping pliers of claim 1, wherein a crimping force is supported by the second bearing body in the second bearing accommodation on the second pliers jaw and a removal force is supported by the counter-holding element.

9. The crimping pliers of claim 8, wherein the counter-holding element is made of plastic.

10. The crimping pliers of claim 1, wherein the first bearing accommodation is a bearing lug, the cross-section of the bearing lug comprising an edge opening which forms a narrowing of the bearing lug, the first bearing body comprises a bearing cross-section which is supported in the bearing lug and which in a direction transverse to the insertion orientation has an insertion extension and in a direction transverse to the securing orientation has a securing extension, the securing extension being larger than the narrowing of the bearing lug so that in the securing orientation the first bearing body is secured against an exit from the bearing lug and the insertion extension being smaller than the narrowing of the bearing lug so that it is possible to insert the first bearing body in the insertion orientation into the bearing lug.

11. The crimping pliers of claim 10, wherein the first bearing body comprises a cylinder segment portion and a flattening.

12. The crimping pliers of claim 10, wherein the first die half unit and the second die half unit have the same size and shape.

13. The crimping pliers of claim 1, wherein at least one of the first bearing body and the second bearing body comprises both:

a) a bearing cross-section which has a securing extension in a direction transverse to the securing orientation and has an insertion extension transverse to the insertion orientation, the securing extension being larger than the insertion extension and b) a latching or locking element by which the first bearing body or the second bearing body can be latched or locked with a counter-holding element of the first or second bearing accommodation.

* * * * *